United States Patent
Hoo

(10) Patent No.: US 12,236,784 B2
(45) Date of Patent: Feb. 25, 2025

(54) FEEDER LANE DIRECTION WARNING SYSTEMS AND METHODS

(71) Applicant: SUBARU CORPORATION, Tokyo (JP)

(72) Inventor: Jia Hwan Hoo, VanBuren Township, MI (US)

(73) Assignee: SUBARU CORPORATION, Tokyo (JP)

( * ) Notice: Subject to any disclaimer, the term of this patent is extended or adjusted under 35 U.S.C. 154(b) by 340 days.

(21) Appl. No.: 17/871,461

(22) Filed: Jul. 22, 2022

(65) Prior Publication Data
US 2024/0038071 A1 Feb. 1, 2024

(51) Int. Cl.
*G08G 1/14* (2006.01)
*G08G 1/0967* (2006.01)

(52) U.S. Cl.
CPC ........... *G08G 1/143* (2013.01); *G08G 1/0967* (2013.01)

(58) Field of Classification Search
CPC ...... G08G 1/143; G08G 1/0967; G08G 1/168; G08G 1/056; B62D 15/027
See application file for complete search history.

(56) References Cited

U.S. PATENT DOCUMENTS 10,481,609 B2 11/2019 Moosaei et al.
10,720,055 B2* 7/2020 Matsuda ................ G08G 1/143
2008/0316056 A1* 12/2008 Ghatak ..................... E04H 6/426
  340/932.2
2012/0135746 A1* 5/2012 Mohlig .................. G01S 5/0018
  455/456.1
2014/0163862 A1* 6/2014 Choi ....................... B60W 30/06
  701/400
2016/0203377 A1* 7/2016 Irie ........................ H04N 23/90
  348/118
2017/0015312 A1* 1/2017 Latotzki ................ B62D 15/027
2017/0232890 A1* 8/2017 Lewis .................... G01C 21/26
  348/148
2018/0164830 A1* 6/2018 Moosaei ................. G08G 1/146
2019/0256091 A1* 8/2019 Lepp ...................... G08G 1/143
2021/0086759 A1* 3/2021 Yamanaka ............ G06V 20/586
2022/0366786 A1* 11/2022 Stenneth ................ G08G 1/143
2023/0222912 A1* 7/2023 Barrett .................... G06Q 10/02
  340/932.2

* cited by examiner

*Primary Examiner* — Donald J Wallace
*Assistant Examiner* — Jalal C Coduroglu
(74) *Attorney, Agent, or Firm* — Rimon P.C.

(57) ABSTRACT

Aspects of the subject technology relate to a feeder lane direction warning system. Entering of an own vehicle into a feeder lane in a parking facility is detected. First data of a first parked vehicle parked in a first row of parking spaces adjacent the feeder lane is received from an external sensor mounted on the own vehicle. A traffic direction of the feeder lane is determined based at least on the received first data of the first parked vehicle. An alert is output via an output device of the own vehicle based on determining that the determined traffic direction of the feeder lane is different from a traveling direction of the own vehicle.

14 Claims, 20 Drawing Sheets

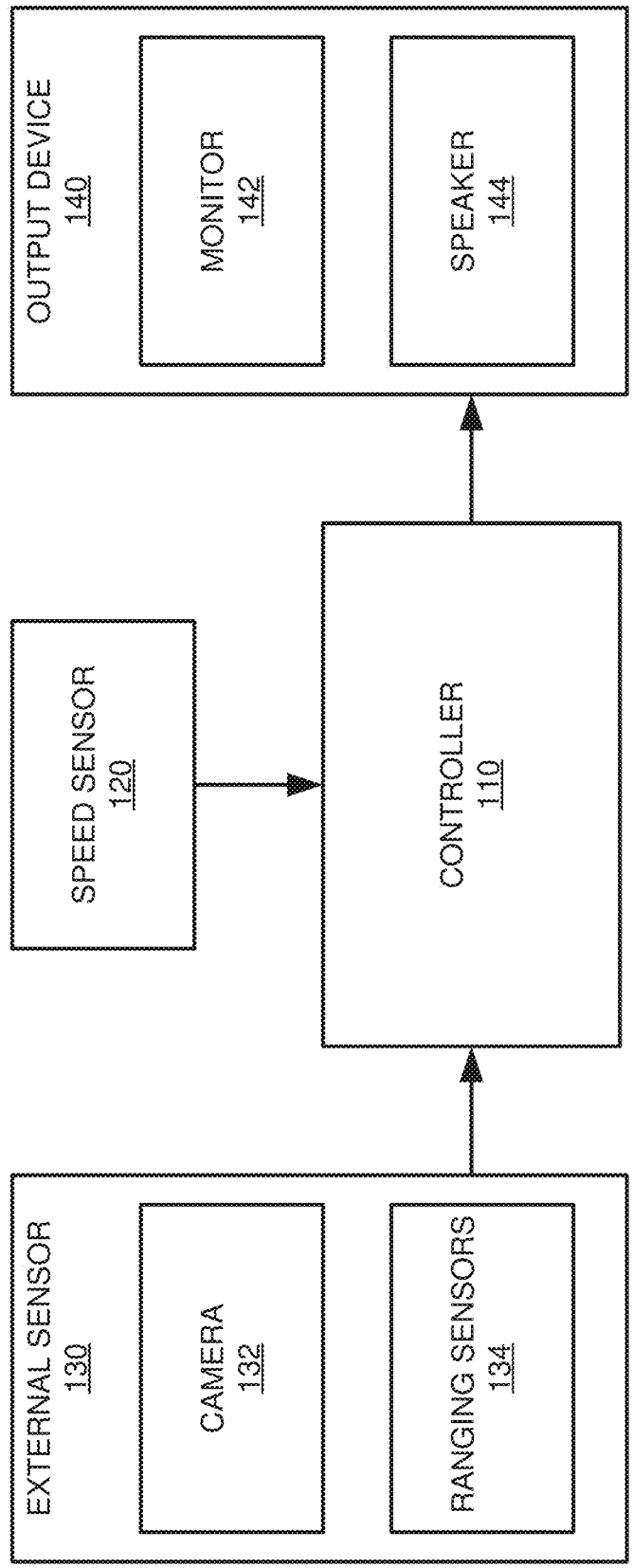

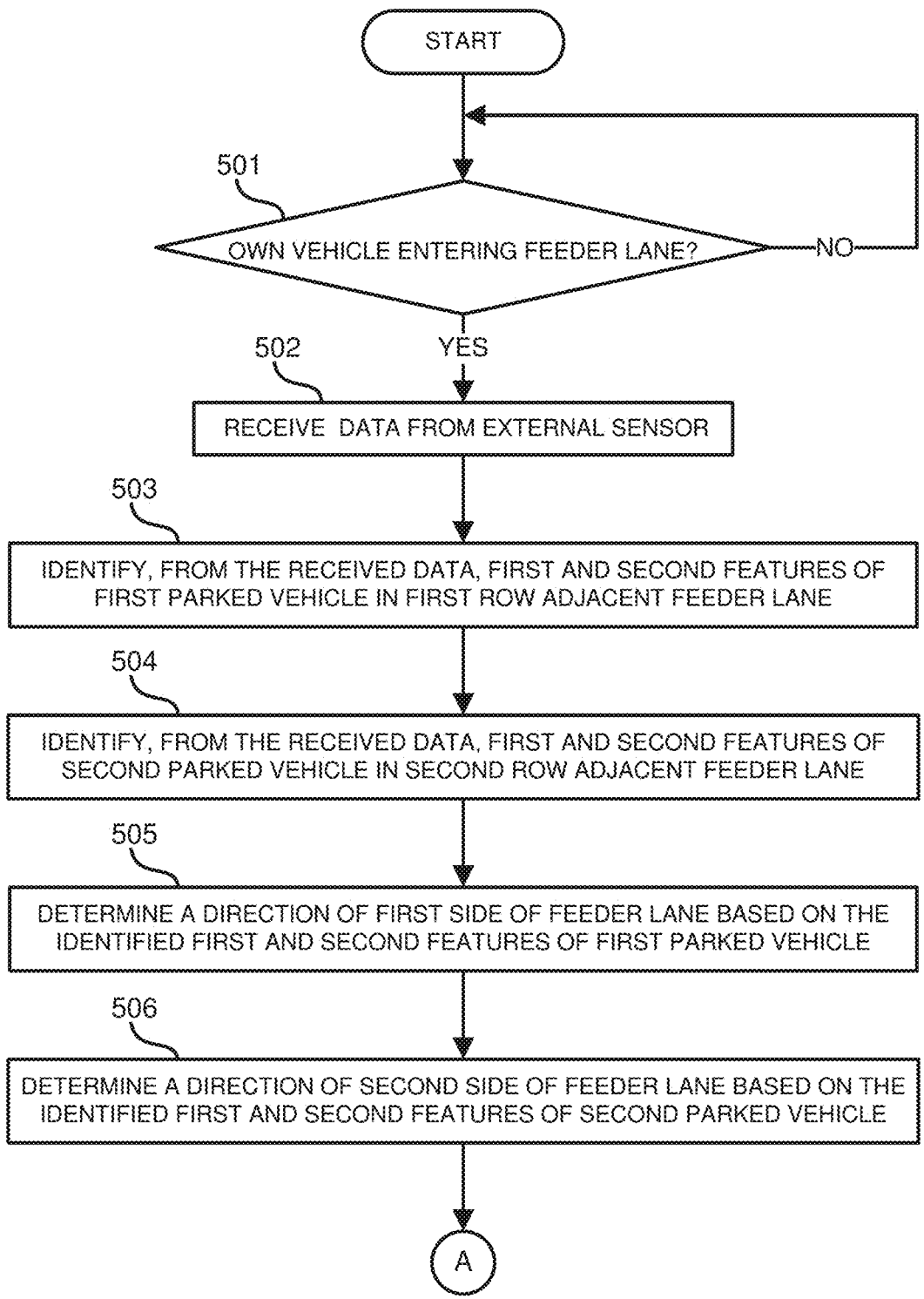

600

700

800

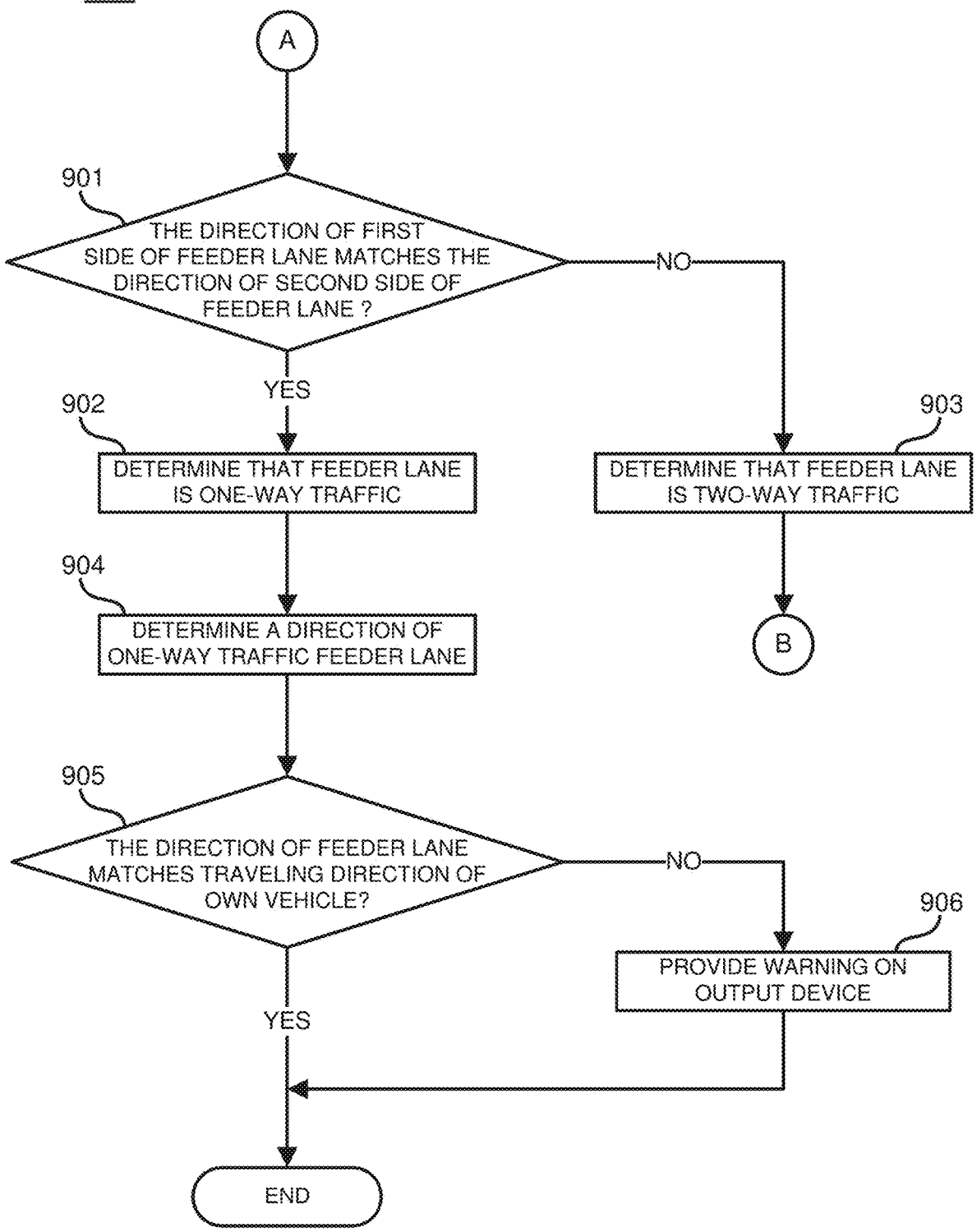

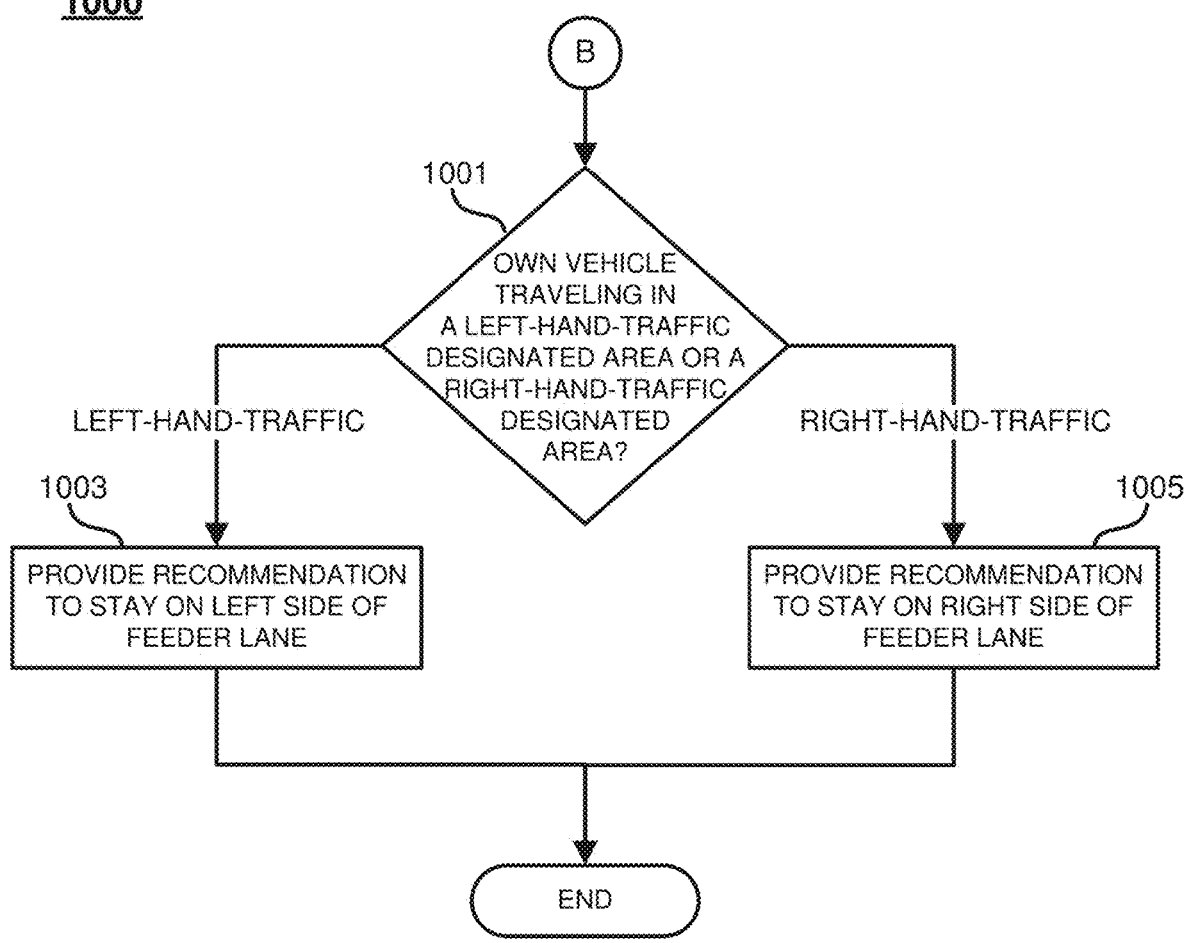

FEEDER LANE DIRECTION WARNING SYSTEMS AND METHODS

BACKGROUND

Field

The present disclosure generally relates to vehicle control systems, and more particularly to feeder lane direction warning systems and methods.

Description of the Related Art

Feeder lanes in parking facilities are the lanes that generally lead vehicles directly to parking spaces. There are three main types of parking for the parking spaces: parallel parking, perpendicular parking, and angle parking. Of the three types of parking, angle parking is the most common type of parking in parking facilities (e.g., parking structures, parking lots, etc.) in the United States. Since angle parking do not require vehicles to make as sharp of a turn when parking, it is easier for vehicles to enter into and out of angle parking spaces when compared to perpendicular parking. In order to allow the vehicles to enter with a less-sharp turn, angle parking typically requires the feeder lane leading vehicles to the angle parking spaces to be in a specific traffic direction.

The description provided in the background section should not be assumed to be prior art merely because it is mentioned in or associated with the background section. The background section may include information that describes one or more aspects of the subject technology.

SUMMARY

The disclosed subject matter relates to systems and methods for feeder lane direction warning systems and methods.

In accordance with various aspects of the subject disclosure, a computer-implemented method, is provided that includes detecting that an own vehicle enters a feeder lane in a parking facility. First data of a first parked vehicle parked in a first row of parking spaces adjacent the feeder lane is received from an external sensor mounted on the own vehicle. A traffic direction of the feeder lane is determined based at least on the received first data of the first parked vehicle. An alert is output via an output device of the own vehicle based on determining that the determined traffic direction of the feeder lane is different from a traveling direction of the own vehicle.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 1 depicts a block diagram of an exemplary parking lot direction warning system of an own vehicle according to example aspects of the subject technology;

FIG. 5 shows a flowchart illustrating an example process for determining a direction of a first side and a direction of a second side of a feeder lane according to example aspects of the subject technology;

FIG. 9 shows a flowchart illustrating an example process for determining a direction of a feeder lane according to example aspects of the subject technology;

FIG. 10 shows a flowchart illustrating an example process for determining a direction of a feeder lane according to example aspects of the subject technology;

Figure 2A:
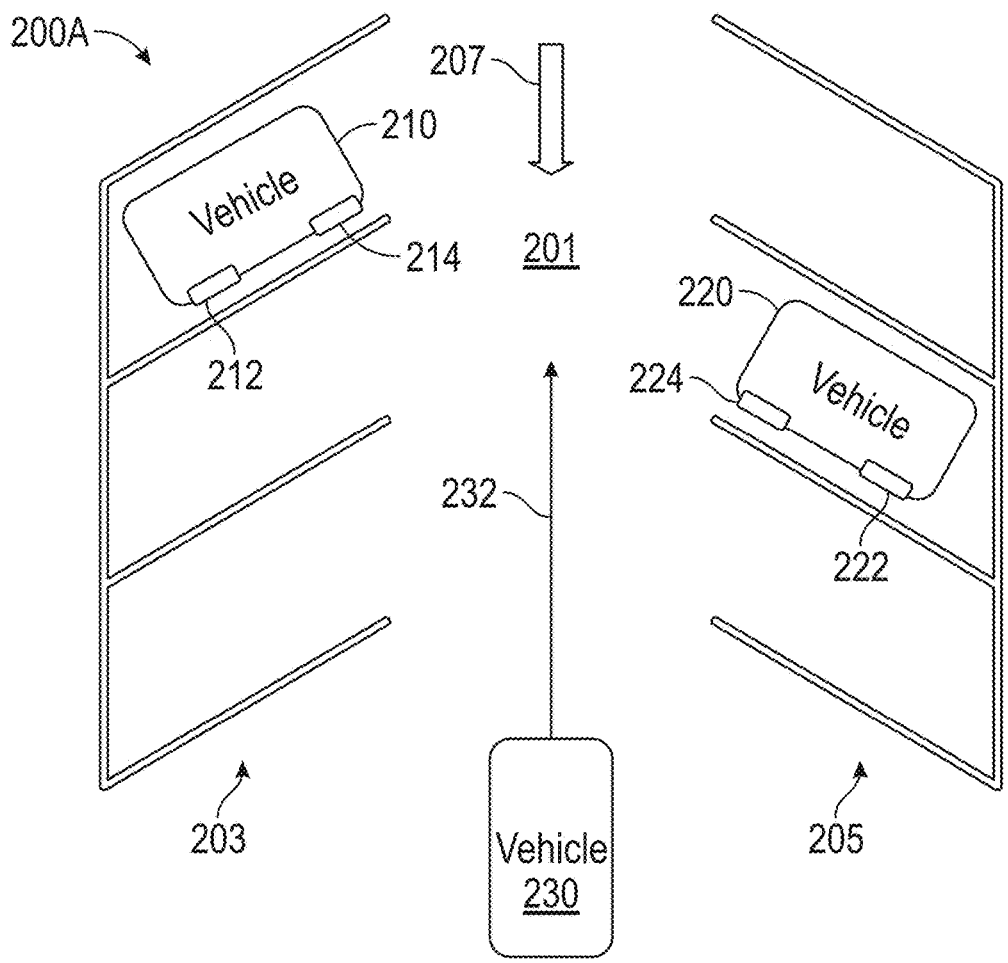
FIG. 2A illustrates a top view of a parking lot according to example aspects of the subject technology.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description may include specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

It is crucial for vehicles to travel in the designated traffic direction through feeder lanes of angle parking in any situation to prevent accidents. For example, many drivers backing from angle parking spaces assume that vehicles traveling the feeder lane are obeying the designated traffic direction. Thus, drivers backing from the angle parking spaces may fail to check for vehicles traveling the feeder lane in the wrong direction. These assumptions and failures may lead to accidents between the vehicles backing from angle parking spaces and the vehicles traveling the feeder lane in the wrong direction.

To prevent accidents caused by wrong-way driving through feeder lanes, the entrances of feeder lanes may include arrows indicating the designated traffic directions. For example, for two-way traffic feeder lanes, since vehicles may enter from both ends of the feeder lane, the arrows may be marked at both ends of the feeder lane. For one-way traffic feeder lanes, since vehicles are allowed to enter from only one end of the feeder lane, the arrow may be marked at only one end (i.e., entrance) of the feeder lane. However, a driver of a vehicle traveling by the exit of the one-way traffic feeder lane may not see the arrow marked on the entrance of the one-way traffic feeder lane. This may lead the driver of the vehicle to inadvertently enter the one-way traffic feeder lane from the wrong end (i.e., exit).

Moreover, even if the entrances of feeder lanes were marked with arrows indicating the designated traffic directions, the markings may fade over time or covered by objects (e.g., plastic bags, cardboard boxes, flyers, etc.) preventing the drivers of vehicles from recognizing the markings at the entrances. For example, if a driver is driving in a foreign country, it is easy for the driver to be confused about whether the driver should be driving on the right-hand-side or the left-hand-side of the feeder lane. Thus, it is particularly helpful for the driver to be able to recognize the arrows at the entrances of the two-way traffic feeder lane. However, when the markings (i.e., arrows) at the entrances cannot be recognized, the driver is burden to instantly determine the correct side of the two-way traffic feeder lane to drive in order to prevent accidents with vehicles backing from angle parking spaces adjacent the two-way traffic feeder lane.

To address the above problems, the subject technology provides technical solutions of providing systems and methods for determining the directions of feeder lanes based on the vehicles parked in angle parking spaces adjacent feeder lanes and providing warning to the drivers driving through the feeder lanes in a wrong direction (i.e., opposite the designated traffic direction).

FIG. 1 depicts a block diagram of an exemplary parking lot direction warning system 100 of an own vehicle according to example aspects of the subject technology. As shown in FIG. 1, parking lot direction warning system 100 includes a controller 110, a speed sensor 120, an external sensor 130, and an output device 140.

Controller 110 may represent various forms of processing devices having at least one or more processors, a memory, and a communication capability. Controller 110 may communicate with speed sensor 120, external sensor 130, and output device 140. For example, controller 110 receives speed data of the own vehicle from speed sensor 120 and data of surrounding environment of the own vehicle from external sensor 130, analyzes the received speed data and surrounding environment data, and controls output device 140 based on the analysis results.

Speed sensor 120 detects a speed of the own vehicle and transmits the speed data of the own vehicle to controller 110. External sensor 130 senses an environment surrounding the own vehicle and transmits the surrounding environment data to controller 110. External sensor 130 may include a camera 132 and one or more ranging sensors 134.

Camera 132 captures images of surrounding areas including at least the forward of the own vehicle. In some embodiments, the surrounding areas captured by camera 132 may include the sideward of the own vehicle. Camera 132 transmits the captured images to controller 110. Camera 132 may be a stereo camera allowing controller 110 to measure depth and distance of one or more objects in the captured images. Camera 132 may be mounted on the own vehicle as a front-facing camera to capture the areas forward of the own vehicle. In some embodiments, camera 132 may be a front-facing camera that captures a wide-angle including the areas that are forward and sideward of the own vehicle. The number of camera 132 is not limited to one as depicted in FIG. 1, but the number of camera 132 may be one or more. For example, in addition to a front-facing camera that captures the areas forward of the own vehicle, camera 132 may include side-facing cameras that capture the areas sideward of the own vehicle.

One or more ranging sensors 134 may include a Lidar (Light Imaging Detection and Ranging) system and a radar (Radio Detection and Ranging) system to detect objects in the areas forward and sideward of the own vehicle. The data regarding the detected objects are transmitted to controller 110. Although FIG. 1 depicts a single ranging sensor 134, the number of ranging sensor 134 is not limited to one, and the number of ranging sensor 134 may be one or more.

Output device 140 includes a monitor 142 and a speaker 144 which are arranged inside the vehicle. Controller 110 may control monitor 142 to display a visual warning to warn the driver of the own vehicle about another vehicle in the areas behind the own vehicle, and control speaker 134 to output an audio warning to warn the driver of the own vehicle about another vehicle in the areas behind the own vehicle.

Monitor 142 may be arranged, for example, on a center console of the own vehicle, an instrumental panel of the vehicle, or a steering wheel of the own vehicle. Monitor 142 may be arranged in other sections of a dashboard of the vehicle as long as the driver of the own vehicle can view the content of monitor 142 from the driver's seat. The number of monitor 142 is not limited to one as depicted in FIG. 1, but the number of monitor 142 may be one or more. For instance, one monitor may be arranged on the center console, and another monitor may be arranged on the instrumental panel. In another instance, two monitors may be arranged adjacent one another on the center console.

Speaker 144 may be arranged anywhere inside the own vehicle as long as the sound from the speaker is audible to the driver of the vehicle. The number of speaker 144 is not limited to one as depicted in FIG. 1, but the number of speaker 144 may be one or more.

Next, the determination of a direction of a feeder lane in a parking lot will be described using FIGS. 2A-10. First, FIGS. 2A, 3A, and 4A that illustrate top views of various types of a parking lot will be described along with FIGS. 2B, 3B, and 4B that respectively illustrate exemplary images of parked vehicles in the parking lots of FIGS. 2A, 3A, and 4A as viewed from the own vehicle. Then, FIG. 5 that illustrates an exemplary flowchart for determining a direction of a feeder lane will be described. Three embodiments related to blocks 505 and 506 of FIG. 5 will be described respectively using the flowcharts of FIGS. 6A, 7A, and 8A. Then, FIGS. 9 and 10 that illustrate flowcharts continuing from the flowchart of FIG. 5 will be described.

FIG. 2A illustrates a top view of a parking lot 200A. Parking lot 200A includes a feeder lane 201, a first row 203 of angled parking, and a second row 205 of angled parking. A designated direction of traffic through feeder lane 201 is represented by an arrow 207. Arrow 207 may be marked at the entrance of feeder lane 201. A first parked vehicle 210 is parked in an angled parking space in first row 203. A second parked vehicle 220 is parked in an angled parking space in second row 205. An own vehicle 230 is a vehicle entering feeder lane 201. An arrow 232 represents a traveling direction of own vehicle 230.

Figure 2B:
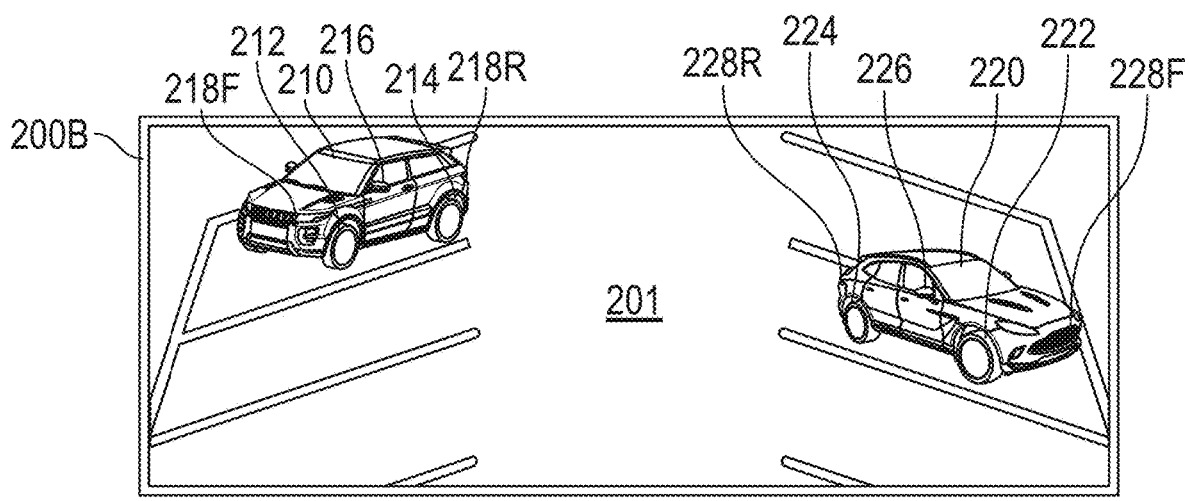
FIG. 2B depicts an image of parking lot of FIG. 2A captured by a camera mounted on an own vehicle according to example aspects of the subject technology.

FIG. 2B depicts image 200B captured by camera 132 mounted on own vehicle 230. Image 200B captures the areas forward of own vehicle 230. Image 200B includes feeder lane 201, first parked vehicle 210 parked in first row 203 adjacent feeder lane 201, and second parked vehicle 220 parked in second row 205 adjacent feeder lane 201. Image 200B may further include features of first parked vehicle 210 and second parked vehicle 220. For example, image 200B may include a front tire 212, a rear tire 214, a side mirror 216, a front end 218F, and a rear end 218R of first parked vehicle. With respect to second parked vehicle 220, image 200B may include a front tire 222, a rear tire 224, a side mirror 226, a front end 228F, and a rear end 228R.

Figure 3A:
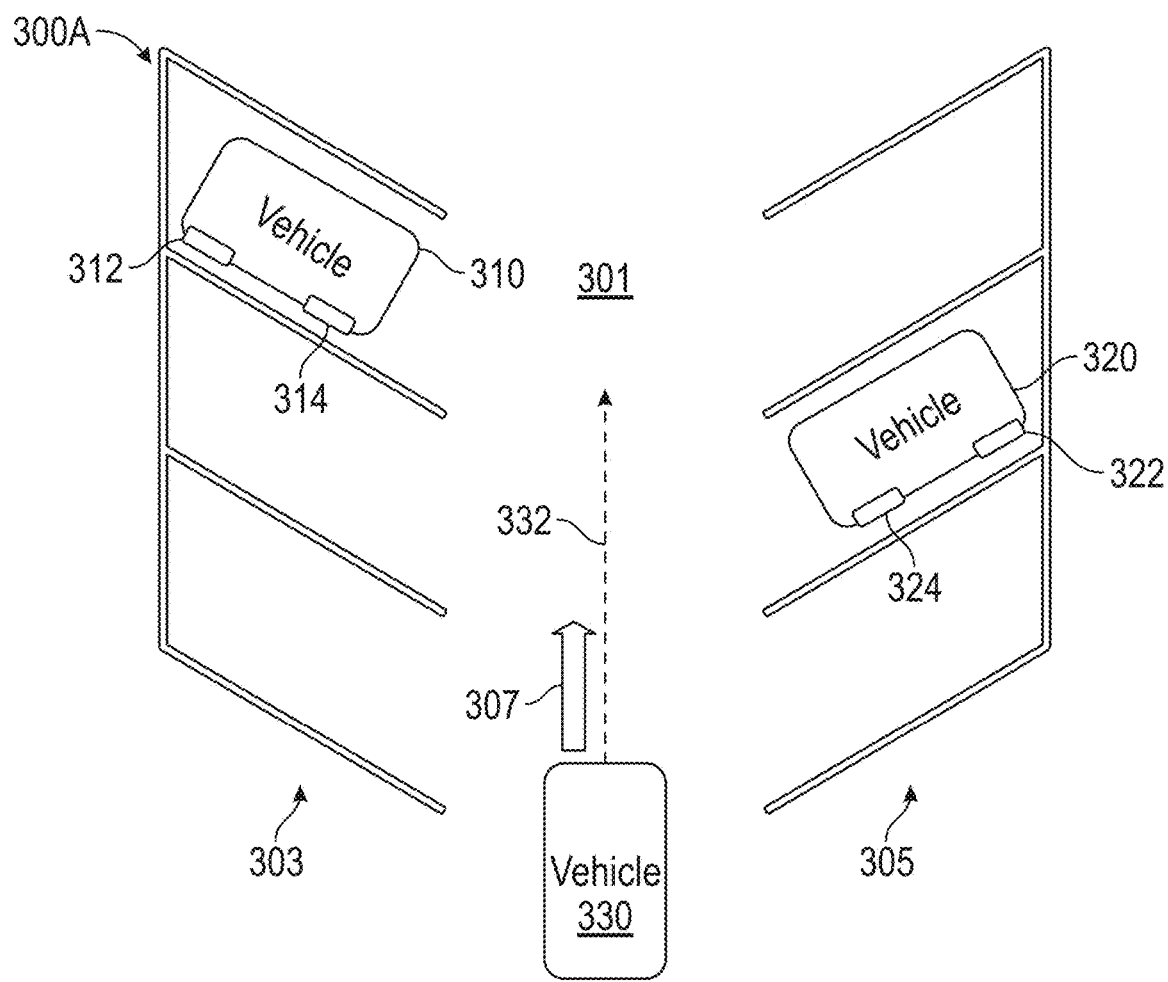
FIG. 3A illustrates a top view of a parking lot according to example aspects of the subject technology.

FIG. 3A illustrates a top view of a parking lot 300A. Parking lot 300A includes a feeder lane 301, a first row 303 of angled parking, and a second row 305 of angled parking. A designated direction of traffic through feeder lane 301 is represented by an arrow 307. Arrow 307 may be marked at the entrance of feeder lane 301. A first parked vehicle 310 is parked in an angled parking space in first row 303. A second parked vehicle 320 is parked in an angled parking space in second row 305. An own vehicle 330 is a vehicle entering feeder lane 301. A dashed arrow 332 represents a traveling direction of own vehicle 330.

Figure 3B:
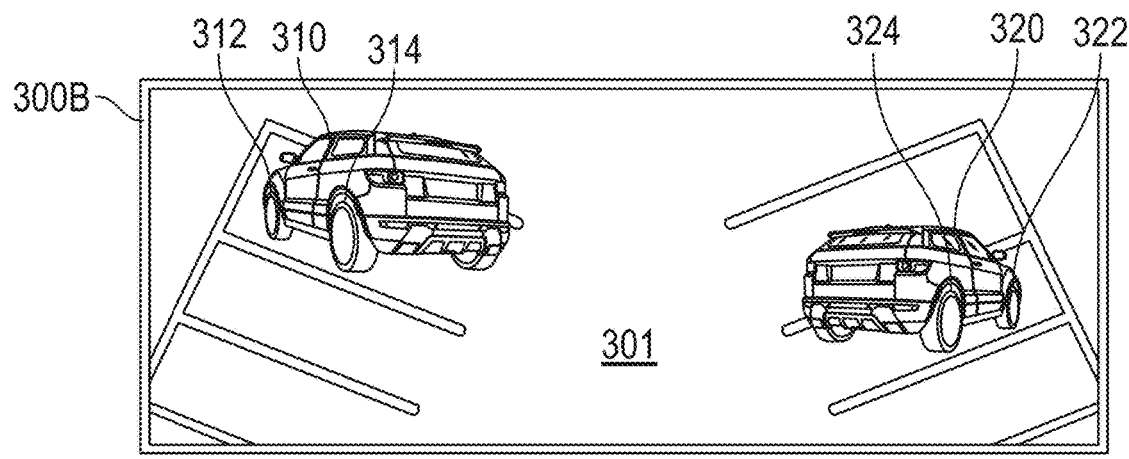
FIG. 3B depicts an image of parking lot of FIG. 3A captured by a camera mounted on an own vehicle according to example aspects of the subject technology

FIG. 3B depicts image 300B of parking lot 300A captured by camera 132 mounted on own vehicle 330. Image 300B captures the areas forward of own vehicle 330. Image 300B includes feeder lane 301, first parked vehicle 310 parked in first row 303 adjacent feeder lane 301, and second parked vehicle 320 parked in second row 305 adjacent feeder lane 301. Image 300B may further include features of first parked vehicle 310 and second parked vehicle 320. For example, image 300B may include a front tire 312 and a rear tire 314 of first parked vehicle 310, and a front tire 322 and a rear tire 324 of second parked vehicle 320.

Figure 4A:
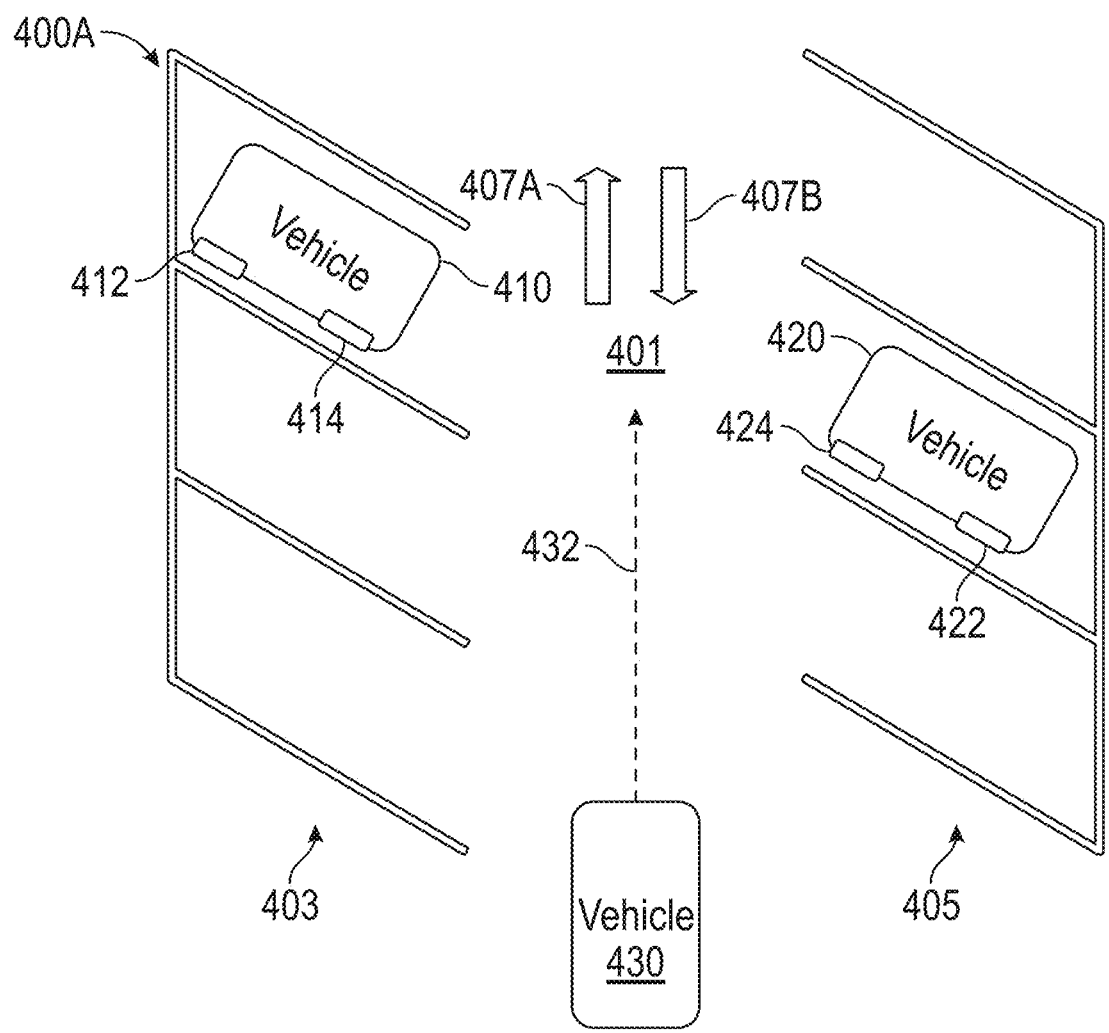
FIG. 4A illustrates a top view of a parking lot according to example aspects of the subject technology.

FIG. 4A illustrates a top view of a parking lot 400A. Parking lot 400A includes a feeder lane 401, a first row 403 of angled parking, and a second row 405 of angled parking. The designated directions of traffic through feeder lane 401 is represented by an arrows 407A and 407B. Arrows 407A and 407B may be marked on feeder lane 401. A first parked vehicle 410 is parked in an angled parking space in first row 403. A second parked vehicle 420 is parked in an angled parking space in second row 405. An own vehicle 430 is a vehicle entering feeder lane 401. A dashed arrow 432 represents a traveling direction of own vehicle 430.

Figure 4B:
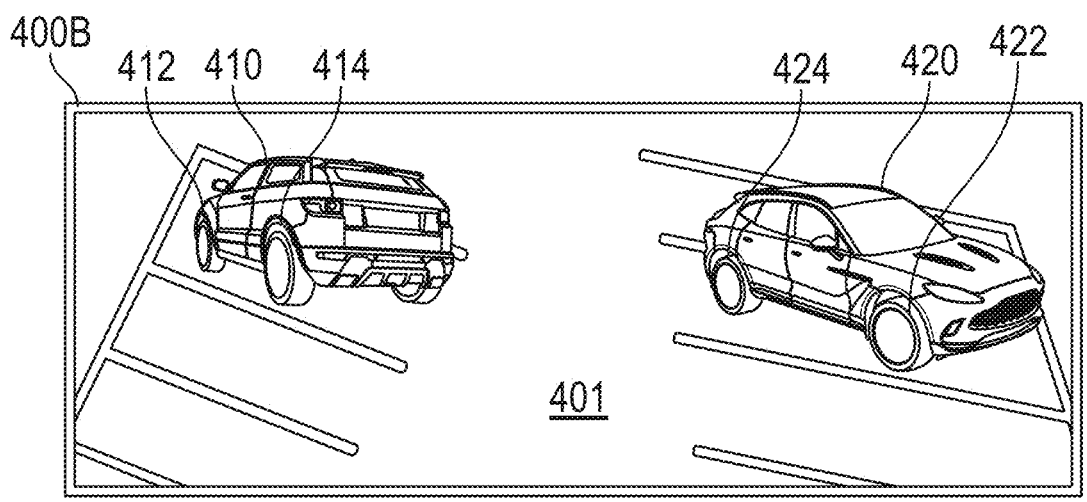
FIG. 4B depicts an image of parking lot of FIG. 4A captured by a camera mounted on an own vehicle according to example aspects of the subject technology.

FIG. 4B depicts image 400B of parking lot 400A captured by camera 132 mounted on own vehicle 430. Image 400B captures the areas forward of own vehicle 430. Image 400B includes feeder lane 401, first parked vehicle 410 parked in first row 403 adjacent feeder lane 401, and second parked vehicle 420 parked in second row 405 adjacent feeder lane 401. Image 400B may further include features of first parked vehicle 410 and second parked vehicle 420. For example, image 400B may include a front tire 412 and a rear tire 414 of first parked vehicle 410, and a front tire 422 and a rear tire 424 of second parked vehicle 420.

Referring to FIG. 5, FIG. 5 shows a flowchart illustrating an example process 500 for controlling an own vehicle according to example aspects of the subject technology. For explanatory purposes, the various blocks of example process 500 are described herein with reference to the components and/or processes described herein. The one or more of the blocks of process 500 may be implemented, for example, by one or more components or processors of controller 110 of FIG. 1. In some implementations, one or more of the blocks may be implemented apart from other blocks, and by one or more different processors or controllers. Further, for explanatory purposes, the blocks of example process 500 are described as occurring in serial, or linearly. However, multiple blocks of example process 500 may occur in parallel. In addition, the blocks of example process 500 need not be performed in the order shown and/or one or more of the blocks of example process 500 need not be performed. Process 500 will be described using FIGS. 2A, 2B, 3A, 3B, 4A, and 4B.

At block 501, controller 110 determines whether own vehicle 230/330/430 is entering a feeder lane (e.g., feeder lane 201/301/401). For example, controller 110 determines that own vehicle 230/330/430 entered feeder lane 201/301/

401 based on a satellite positioning system such as the global positioning system (GPS). Yet in another example, controller 110 determines that own vehicle 230/330/430 entered feeder lane 201 based on a combination of the satellite positioning system and the speed of own vehicle 230/330/430. Controller 110 may receive speed data of own vehicle 230/330/430 from speed sensor 120, and determines whether the speed of own vehicle 230/330/430 is equal to or below a predetermined threshold speed based on the received speed data. The predetermined threshold speed may be 15 kilometers per hour or 10 kilometers per hour. When controller 110 determines that the speed of own vehicle 230/330/430 is equal to or below the predetermined threshold speed in addition to the satellite positioning system indicating that the own vehicle 230/330/430 has entered feeder lane 201/301/401, controller 110 determines that own vehicle 230/330/430 has entered feeder lane 201/301/401.

When controller 110 determines that own vehicle 230/330/430 is not entering feeder lane 201/301/401 (block 501=NO), process 500 repeats block 501. When controller 110 determines that the speed of own vehicle 230/330/430 is equal to or below the predetermined threshold speed, controller 110 determines that own vehicle 230/330/430 is entering feeder lane 201/301/401. When controller 110 determines that the speed of own vehicle 230/330/430 is entering feeder lane 201/301/401 (block 501=YES), process 500 proceeds to block 502.

At block 502, controller 110 receives data from external sensor 130. Data from external sensor 130 may be received in response to own vehicle 230/330/430 entering feeder lane 201/301/401. Data from external sensor 130 may include images captured by camera 132 and data collected by one or more ranging sensors 134. For example, controller 110 receives image 200B/300B/400B depicted in FIG. 2B/3B/4B from camera 132.

At block 503, controller 110 identifies, from the received data, two features from a first parked vehicle (e.g., first parked vehicle 210/310/410) in a first row (e.g., first row 203) adjacent the feeder lane (e.g., feeder lane 201/301/401). The two features include a first feature and a second feature of the first parked vehicle (e.g., first parked vehicle 210/310/410). The second feature is closer to the feeder lane (e.g., feeder lane 201/301/401) than the first feature such that the first feature and the second feature do not align vertically with each other. For example, controller 110 may identify, using images (e.g., image 200B/300B/400B) received from camera 132, front tire 212/312/412 and rear tire 214/314/414 of first parked vehicle 210/310/410 as a first feature and a second feature of first parked vehicle 210/310/410, respectively.

At block 504, controller 110 identifies, from the received data, two features from a second parked vehicle (e.g., second parked vehicle 220/320/420) in a second row (e.g., second row 205/305/405) adjacent the feeder lane (e.g., feeder lane 201/301/401). The two features include a first feature and a second feature of second parked vehicle 220/320/420. The second feature is closer to the feeder lane (e.g., feeder lane 201/301/401) than the first feature such that the first feature and the second feature do not align vertically with each other. For example, controller 110 may identify, using images received from camera 132, front tire 222/322/422, and rear tire 224/324/424 of second parked vehicle 220/320/420 as a first feature and a second feature of second parked vehicle 220/320/420, respectively.

In some embodiments, controller 110 may identify more than two features from the first parked vehicle (e.g., first parked vehicle 210/310/410). When controller 110 identifies more than two features of first parked vehicle 210/310/410, controller 110 selects two features (i.e., a first feature or a second feature) from the identified more than two features as long as one of the selected two features is closer to the feeder lane (i.e., feeder lane 201/301/401) than the other feature of the selected two features. For example, controller 110 identifies front tire 212/312/412, rear tire 214/314/414, and side mirror 216/316/416 of first parked vehicle 210/310/410. Controller 110 may select, from the identified features (i.e., front tire 212/312/412, rear tire 214/314/414, and side mirror 216/316/416), front tire 212/312/412 and rear tire 214/314/414 as the first feature and the second feature of first parked vehicle 210/310/410, respectively. With respect to the second parked vehicle, controller 110 may similarly identify more than two features of the second parked vehicle (i.e., second parked vehicle 220/320/420) and select two features from the identified more than two features. For example, controller 110 may identify front tire 222/322/422, rear tire 224/324/424, and a side mirror 226/326/426 of second parked vehicle 220/320/420, and select side mirror 226/326/426 and rear tire 224/324/424 as the first feature and the second feature of second parked vehicle 220/320/420, respectively.

In some embodiments, controller 110 may identify the two features of the parked vehicle based on the data received from one or more ranging sensors 134. Controller 110 may identify, as the two features, a front end and a rear end of the parked vehicle. For example, controller 110 may identify front end 218F/318F/418F and rear end 218R/318R/418R of first parked vehicle 210/310/410 as the first feature and the second feature of first parked vehicle 210/310/410, respectively. For example, controller 110 may identify front end 228F/328F/428F and rear end 228R/328R/428R of second parked vehicle 220/320/420 as the first feature and the second feature of second parked vehicle 220/320/420, respectively.

At block 505, controller 110 determines a direction of a first side of the feeder lane (e.g., feeder lane 201/301/401) based on the identified first feature and the identified second feature of the first parked vehicle (e.g., first parked vehicle 210/310/410) in the first row (e.g., first row 203/303/403). The first side of the feeder lane is the side of the feeder lane that is closer to the first row (e.g., first row 203/303/403) than the second row (e.g., second row 205/305/405). At block 506, controller 110 determines a direction of a second side of the feeder lane (e.g., feeder lane 201/301/401) based on the identified first feature and the identified second feature of the second parked vehicle (e.g., second parked vehicle 220/320/420) in the second row (e.g., second row 205/305/405). The second side of the feeder lane is the side of the feeder lane that is closer to the second row (e.g., second row 205/305/405) than the first row (e.g., first row 203/303/403).

The direction may be a first direction that is a direction against the traveling direction (e.g., traveling direction 232/332/432) of the own vehicle (e.g., own vehicle 230/330/430) or a second direction that is the same direction as the traveling direction (e.g., traveling direction 232/332/432) of the own vehicle (e.g., own vehicle 230/330/430). Namely, the first direction is a direction that is against the traveling direction of the own vehicle and the second direction is a direction that is along the traveling direction of the own vehicle. Three embodiments of the direction determinations in blocks 505 and 506 of FIG. 5 will be respectively described using flowcharts of FIGS. 6A, 7A, and 8A.

Figure 6A:
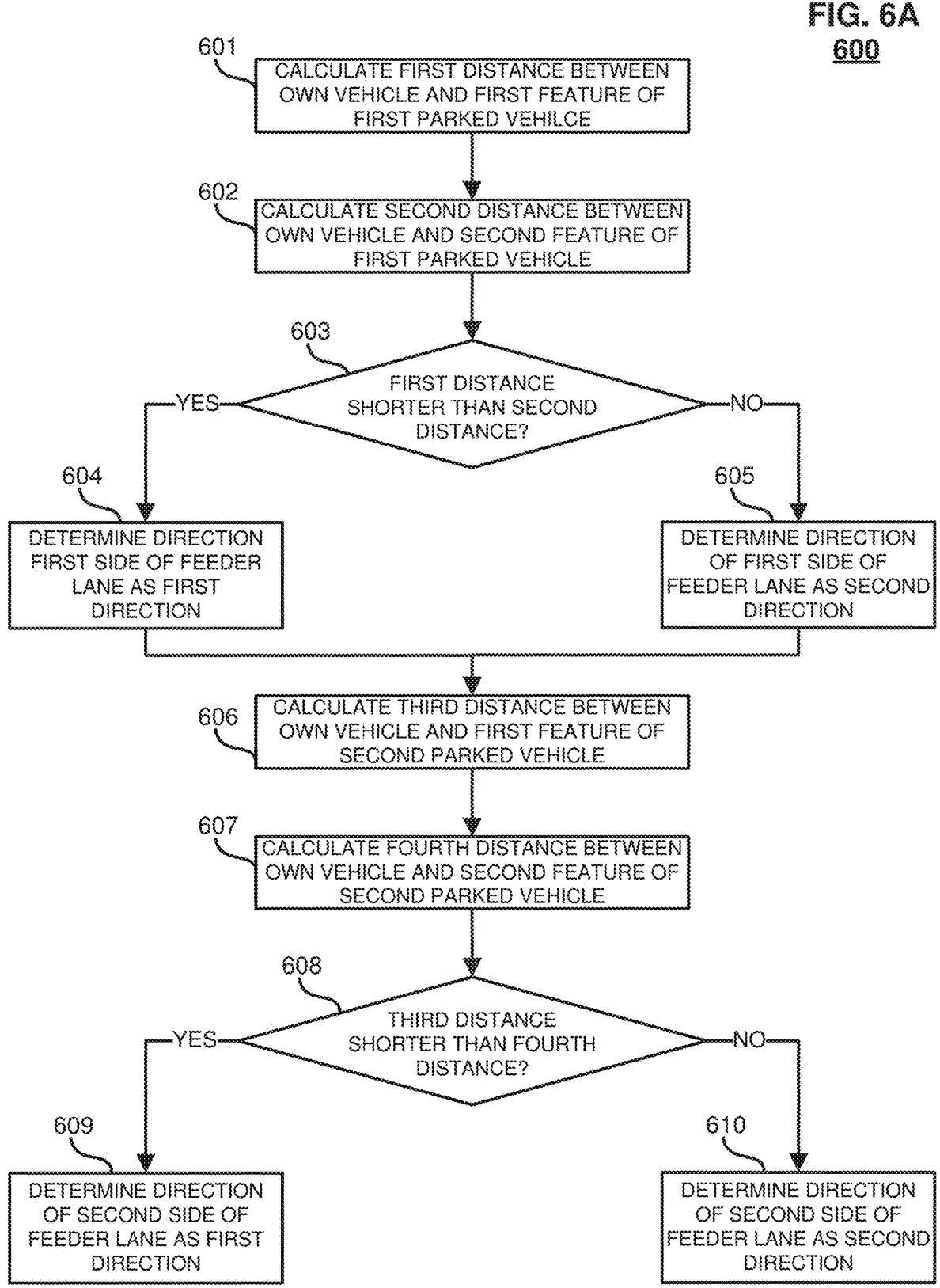
FIG. 6A shows a flowchart illustrating an example process for determining a direction of a first side and a direction of a second side of a feeder lane according to example aspects of the subject technology.

FIG. 6A shows a flowchart illustrating an example process 600 for determining a direction of the first side and a direction of the second side of the feeder lane (e.g., feeder lane 201/301/401) according to example aspects of the subject technology. For explanatory purposes, the various blocks of example process 600 are described herein with reference to the components and/or processes described herein. The one or more of the blocks of process 600 may be implemented, for example, by one or more components or processors of controller 110 of FIG. 1. In some implementations, one or more of the blocks may be implemented apart from other blocks, and by one or more different processors or controllers. Further, for explanatory purposes, the blocks of example process 600 are described as occurring in serial, or linearly. However, multiple blocks of example process 600 may occur in parallel. In addition, the blocks of example process 600 need not be performed in the order shown and/or one or more of the blocks of example process 600 need not be performed.

Figure 6B:
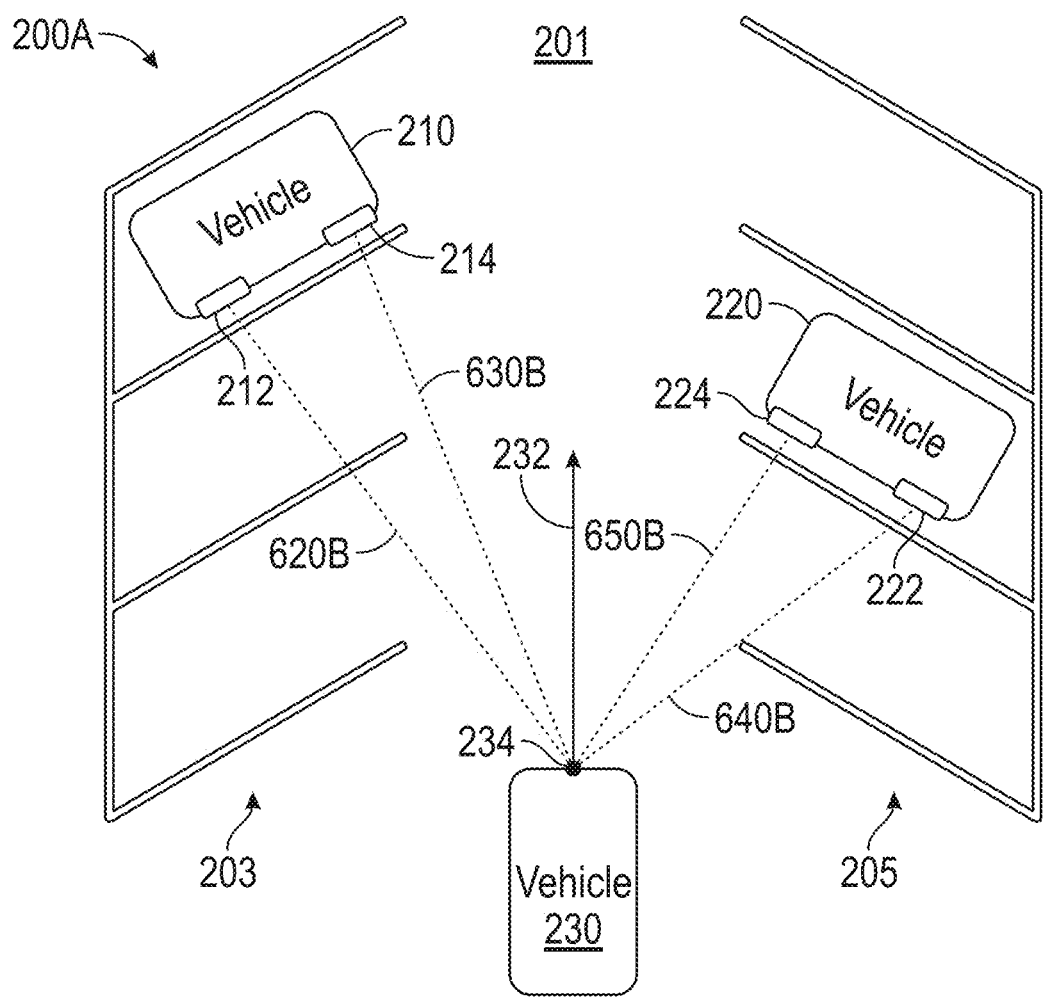
FIG. 6B depicts a top view of parking lot of FIG. 2A with measurements for determining a direction of a first side and a direction of a second side of a feeder lane according to the example process of FIG. 6A.
Figure 6C:
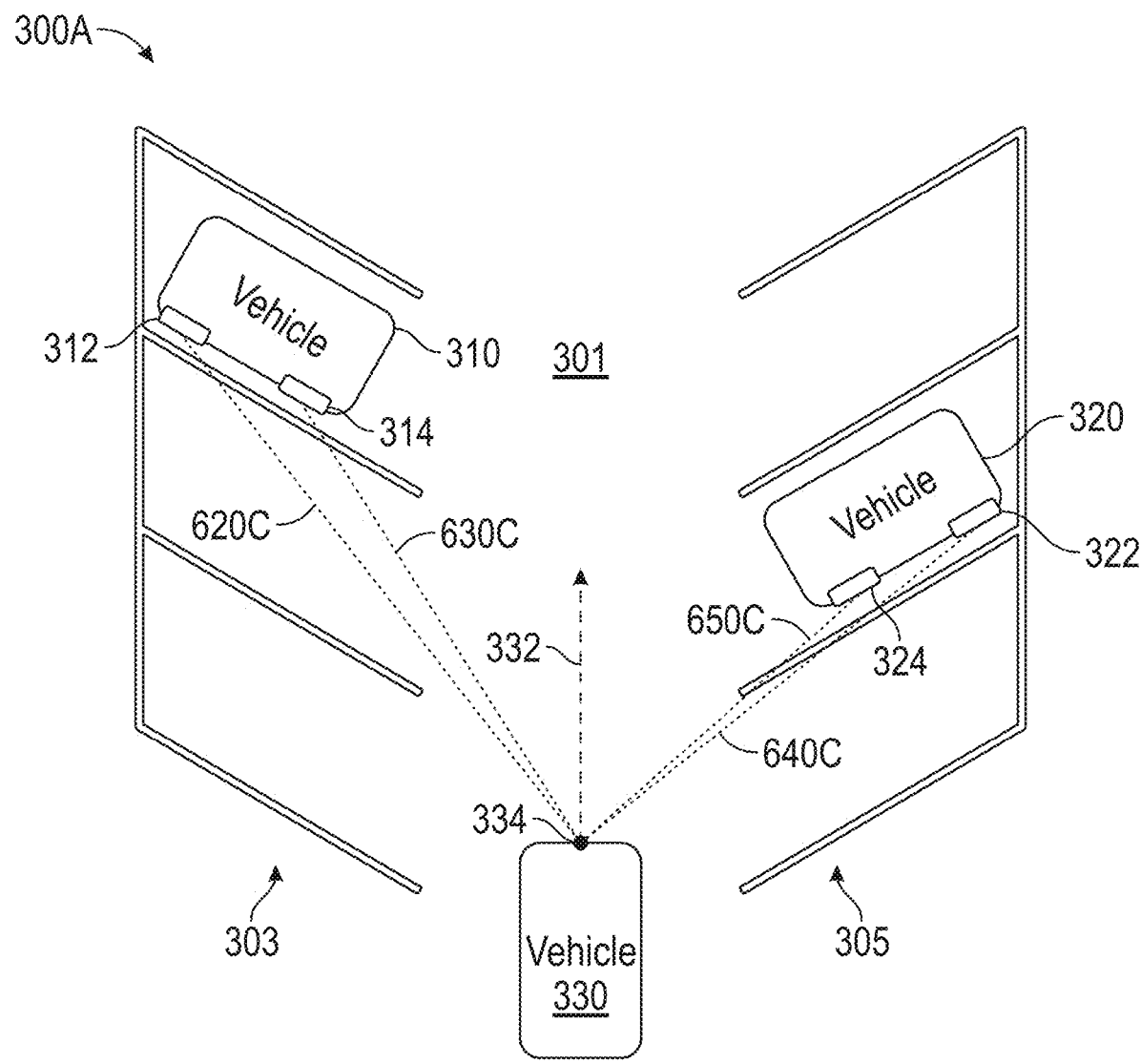
FIG. 6C depicts a top view of parking lot of FIG. 3A with measurements for determining a direction of a first side and a direction of a second side of a feeder lane according to the example process of FIG. 6A.
Figure 6D:
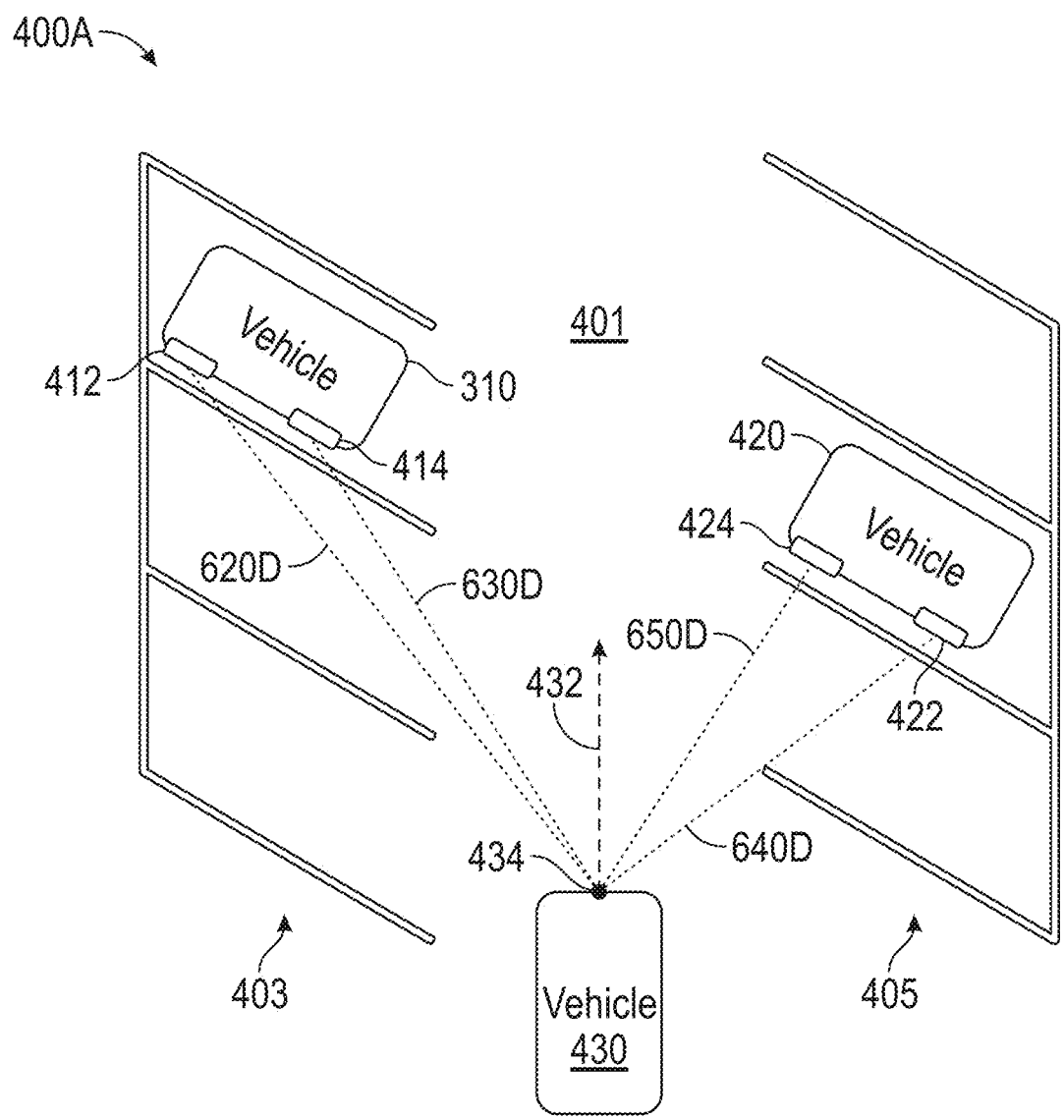
FIG. 6D depicts a top view of parking lot of FIG. 4A with measurements for determining a direction of a first side and a direction of a second side of a feeder lane according to the example process of FIG. 6A.

The flowchart of FIG. 6A will be described using (I) FIG. 6B in which part of parking lot 200A depicted in FIG. 2A is reproduced; (II) FIG. 6C in which part of parking lot 300A is reproduced; and (III) FIG. 6D in which part of parking lot 400A is reproduced.

At block 601, controller 110 calculates a first distance between a reference point of the own vehicle and the identified first feature of the first parked vehicle in the first row adjacent the feeder lane. For example, referring to FIG. 6B/6C/6D, controller 110 calculates a first distance 620B/620C/620D between a reference point 234/334/434 of own vehicle 230/330/430 and front tire 212/312/412 (i.e., identified first feature) of first parked vehicle 210/310/410 in first row 203/303/403 adjacent feeder lane 201/301/401. Reference point 234/334/434 of the own vehicle (e.g., own vehicle 230/330/430) may be set to a center of a front end of the own vehicle. In some embodiments, the reference point (e.g., reference point 234/334/434) may be set where camera 132 is mounted on the own vehicle (e.g., own vehicle 230/330/430) or anywhere else on the own vehicle.

At block 602, controller 110 calculates a second distance between the reference point of the own vehicle and the identified second feature of the first parked vehicle in the first row adjacent the feeder lane. For example, referring to FIG. 6B/6C/6D, controller 110 calculates a second distance 630B/630C/630D between reference point 234/334/434 of own vehicle 230/330/430 and rear tire 214/314/414 (i.e., identified second feature) of first parked vehicle 210/310/410 in first row 203/303/403 adjacent feeder lane 201/301/401.

For example, controller 110 uses images received from camera 132 to measure the first and second distances (e.g., first distance 620B/620C/620D and second distance 630B/630C/630D). In some embodiments, controller 110 may use data from one or more ranging sensors 134 to measure the first and second distances (e.g., first distance 620B/620C/620D and second distance 630B/630C/630D).

At block 603, controller 110 determines whether the calculated first distance (e.g., first distance 620B/620C/620D) is shorter than the calculated second distance (e.g., second distance 630B/630C/630D). When both of the calculated first distance and the calculated second distance are within the predetermined range of distance from own vehicle 230/330/430, controller 110 may proceed to compare the calculated first distance to the calculated second distance. When either of the calculated first distance and the calculated second distance is not within the predetermined range of distance from own vehicle 230/330/430, controller 110 terminates process 600.

When the calculated first distance is shorter than the calculated second distance (block 603=YES), process 600 proceeds to block 604 in which controller 110 determines that the direction of the first side of the feeder lane (e.g., feeder lane 201/301/401) as the first direction (i.e., direction against the traveling direction of the own vehicle). When the calculated first distance is not shorter than the calculated second distance (block 603=NO), process 600 proceeds to block 605 in which controller 110 determines that the direction of the first side of the feeder lane (e.g., feeder lane 201/301/401) as the second direction (i.e., direction along the traveling direction of the own vehicle).

In some embodiments, controller 110 may first calculate a first reference distance based on the calculated second distance, and then compare the calculated first distance to the calculated first reference distance. Controller 110 may calculate the first reference distance by multiplying the calculated second distance with an estimation factor. The estimation factor may be predetermined based on experimentations and stored in the memory of controller 110. The estimation factor may be more than zero but less than 1 (e.g., 0.3, 0.8, etc.). For example, controller 110 multiplies the calculated second distance by an estimation factor (e.g., 0.8), and sets the product of the calculated second distance and the estimation factor as the first reference distance. Controller 110 compares the calculated first distance with the first reference distance. When the calculated first distance is shorter than the calculated first reference distance, controller 110 determines that the direction of the first side of the feeder lane (e.g., feeder lane 201/301/401) as the first direction (i.e., direction against the traveling direction of the own vehicle). When the calculated first distance is not shorter than the calculated first reference distance controller 110 determines that the direction of the first side of the feeder lane (e.g., feeder lane 201/301/401) as the second direction (i.e., direction along the traveling direction of the own vehicle).

In some embodiments, controller 110 may continuously repeat process 600 while own vehicle 230/330/430 travels through feeder lane 201/301/401. In such a case, when controller 110 determines that the calculated first distance is shorter than the calculated second distance in the previous process and when controller 110 determines that the calculated first distance is equal to the calculated second distance in the current process (subsequent to the previous process), controller 110 terminates process 600.

At block 606, controller 110 calculates a third distance between the reference point of the own vehicle and the identified first feature of the second parked vehicle in the second row adjacent the feeder lane. For example, referring to FIG. 6B/6C/6D, controller 110 calculates a third distance 640B/640C/640D between reference point 234/334/434 of own vehicle 230/330/430 and front tire 222/322/422 (i.e., identified first feature) of second parked vehicle 220/320/420 in second row 205/305/405 adjacent feeder lane 201/301/401.

At block 607, controller 110 calculates a fourth distance between the reference point of the own vehicle and the identified second feature of the second parked vehicle in the second row adjacent the feeder lane. For example, referring to FIG. 6B/6C/6D, controller 110 calculates a fourth distance 650B/650C/650D between reference point 234/334/434 of own vehicle 230/330/430 and rear tire 224/324/424 (i.e., identified second feature) of second parked vehicle 220/320/420 in second row 205/305/405 adjacent feeder lane 201/301/401. Similar to first distance 620B/620C/620D and second distance 630B/620C/620D, controller 110 may use the images received from camera 132 and/or the data from one or more ranging sensor 134 to measure third distance 640B/640C/640D and fourth distance 650B/650C/650D.

At block 608, controller 110 determines whether the calculated third distance (e.g., third distance 640B/640C/640D) is shorter than the calculated fourth distance (e.g., fourth distance 650B/650C/650D). Similar to block 603, controller 110 may determine whether the calculated third distance and the calculated fourth distance are within the predetermined range of distance (e.g., 10 meters to 30 meters). When both of the calculated first distance and the calculated second distance are within the predetermined range of distance, controller 110 may compare the calculated first distance to the calculated second distance. Otherwise, controller 110 terminates process 600.

When the calculated third distance is shorter than the calculated fourth distance (block 608=YES), process 600 proceeds to block 609 in which controller 110 determines that the direction of the second side of the feeder lane (e.g., feeder lane 201/301/401) as the first direction. When the calculated third distance is not shorter than the calculated fourth distance (block 608=NO), process 600 proceeds to block 610 in which controller 110 determines that the direction of the second side of the feeder lane (e.g., feeder lane 201/301/401) as the second direction opposite the first direction.

In some embodiments, controller 110 may first calculate a second reference distance based on the calculated fourth distance, and then compare the calculated third distance to the calculated second reference distance. For example, controller 110 may calculate the second reference distance by multiplying the calculated fourth distance with the estimation factor used to calculate the first reference distance. For example, when the calculated third distance is shorter than the calculated second reference distance, controller 110 determines that the direction of the first side of the feeder lane (e.g., feeder lane 201/301/401) as the first direction (i.e., direction against the traveling direction of the own vehicle). When the calculated third distance is not shorter than the calculated second reference distance controller 110 determines that the direction of the first side of the feeder lane (e.g., feeder lane 201/301/401) as the second direction (i.e., direction along the traveling direction of the own vehicle).

Figure 7A:
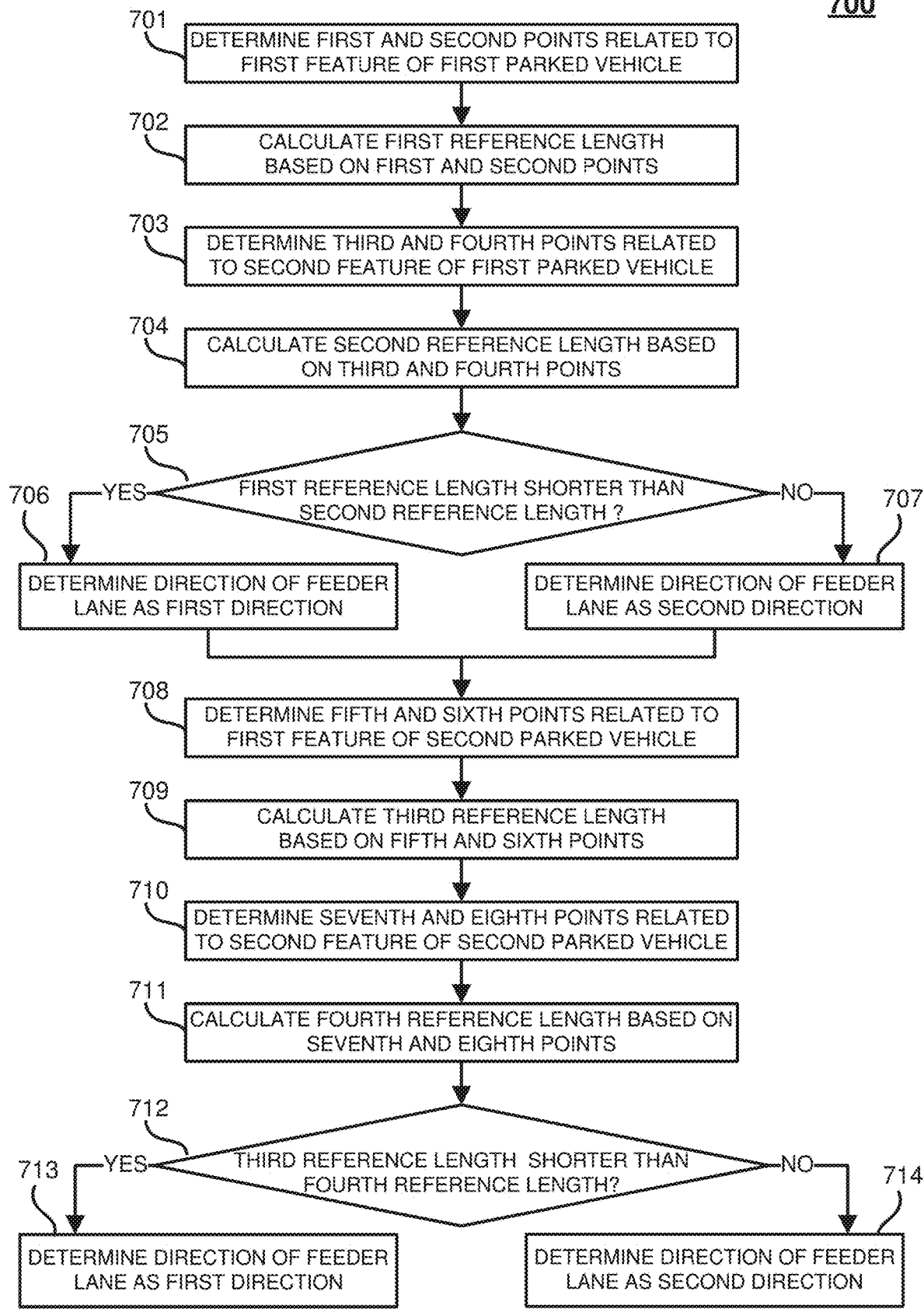
FIG. 7A shows a flowchart illustrating an example process for determining a direction of a first side and a direction of a second side of a feeder lane according to example aspects of the subject technology.

FIG. 7A shows a flowchart illustrating an example process 700 for determining a direction of the first side and a direction of the second side of the feeder lane (e.g., feeder lane 201/301/401) according to example aspects of the subject technology. For explanatory purposes, the various blocks of example process 700 are described herein with reference to the components and/or processes described herein. The one or more of the blocks of process 700 may be implemented, for example, by one or more components or processors of controller 110 of FIG. 1. In some implementations, one or more of the blocks may be implemented apart from other blocks, and by one or more different processors or controllers. Further, for explanatory purposes, the blocks of example process 700 are described as occurring in serial, or linearly. However, multiple blocks of example process 700 may occur in parallel. In addition, the blocks of example process 700 need not be performed in the order shown and/or one or more of the blocks of example process 700 need not be performed. The flowchart of FIG. 7A will be described using (I) FIG. 7B in which part of parking lot 200A depicted in FIG. 2A is reproduced; (II) FIG. 7C in which part of parking lot 300A is reproduced; and (III) FIG. 7D in which part of parking lot 400A is reproduced.

Figure 7B:
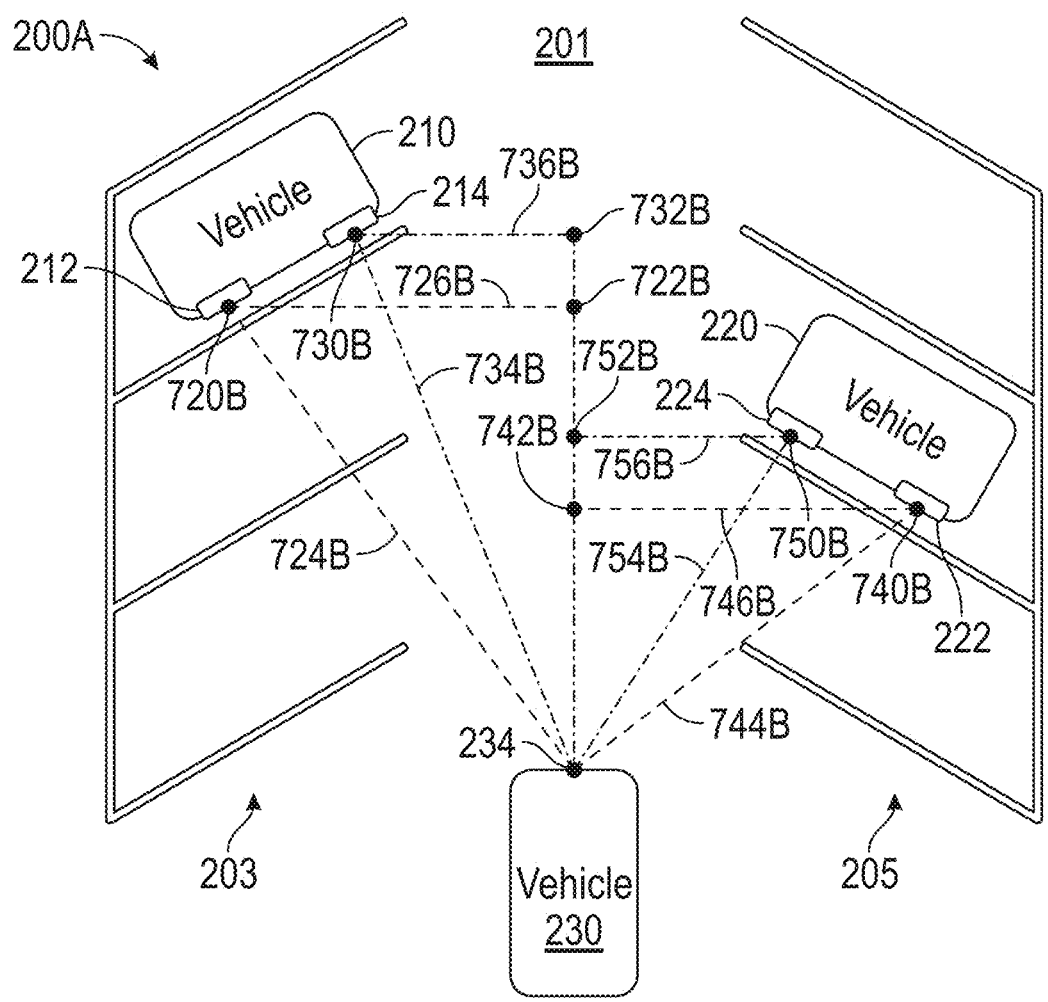
FIG. 7B depicts a top view of parking lot of FIG. 2A with measurements for determining a direction of a first side and a direction of a second side of a feeder lane according to the example process of FIG. 7A.
Figure 7C:
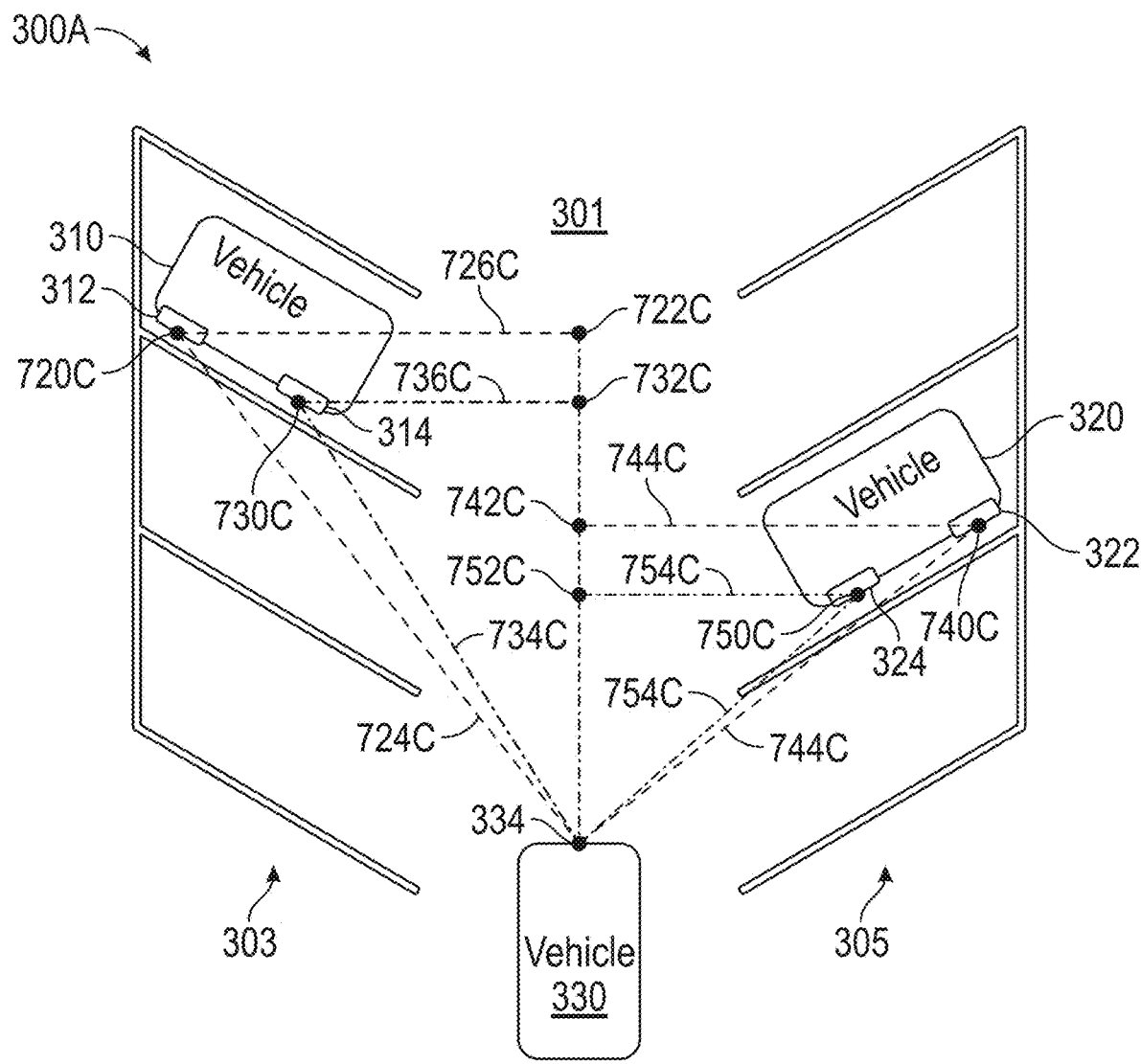
FIG. 7C depicts a top view of parking lot of FIG. 3A with measurements for determining a direction of a first side and a direction of a second side of a feeder lane according to the example process of FIG. 7A.
Figure 7D:
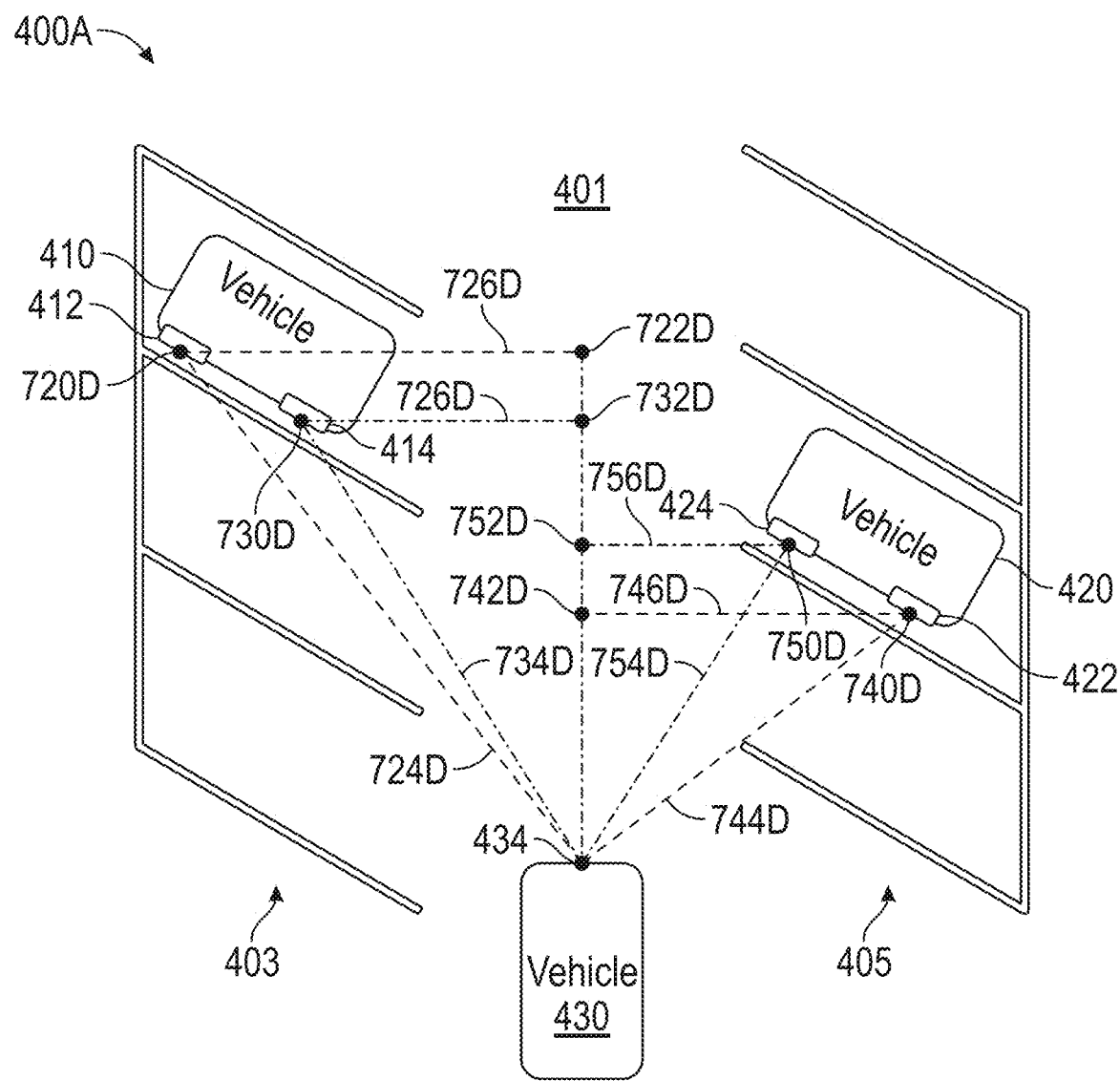
FIG. 7D depicts a top view of parking lot of FIG. 4A with measurements for determining a direction of a first side and a direction of a second side of a feeder lane according to the example process of FIG. 7A.

At block 701, controller 110 determines a first point and a second point related to the identified first feature of the first parked vehicle in the first row adjacent the feeder lane. Referring to FIG. 7B/7C/7D, using the data from external sensor 130, controller 110 sets a first point 720B/720C/720D at front tire 212/312/412 (i.e., identified first feature) of first parked vehicle 210/310/410 in first row 203/303/403 adjacent feeder lane 201/301/401. Controller 110 may use a coordinate system (e.g., three-dimensional coordinate system, two-dimensional coordinate system, etc.) to determine a first coordinate point $(X_{720B/720C/720D}, Y_{720B/720C/720D})$ that corresponds to the location of first point 720B/720C/720D.

Controller 110 determines a second point 722B/722C/722D based on reference point 234/334/434 and first point 720B/720C/720D. Controller 110 determines second point 722B/722C/722D by generating a first right triangle (e.g., dashed right triangle on the first side of the feeder lane) using reference point 234/334/434, first point 720B/720C/720D, and second point 722B/722C/722D such that a right angle of the first right triangle is located at an internal angle of second point 722B/722C/722D. Further, second point 722B/722C/722D is located closer to feeder lane 201/301/401 than first point 720B/720C/720D. For example, controller 110 determines a reference coordinate point $(X_{234/334/434}, Y_{234/334/434})$ corresponding to reference point 234/334/434 using the coordinate system. Based on the first coordinate point $(X_{720B/720C/720D}, Y_{720B/720C/720D})$ corresponding to first point 720B/720C/720D and the reference coordinate point $(X_{234/334/434}, Y_{234/334/434})$ corresponding to reference point 234/334/434, controller 110 determines a second coordinate point $(X_{234/334/434}, Y_{720B/720C/720D})$ corresponding to the location of second point 722B/722C/722D.

At block 702, controller 110 calculates a first reference length associated with the first feature of the first parked vehicle in the first row of the feeder lane. For example, referring to FIG. 7B/7C/7D, controller 110 calculates a first reference length extending between reference point 234/334/434 and second point 722B/722C/722D based on, for example, the reference coordinate point $(X_{234/334/434}, Y_{234/334/434})$ corresponding to reference point 234/334/434 and the second coordinate point $(X_{234/334/434}, Y_{720B/720C/720D})$ corresponding to the location of second point 722B/722C/722D.

Controller 110 may calculate a first length 724B/724C/724D extending between reference point 234/334/434 and first point 720B/720C/720D based on, for example, the first coordinate point $(X_{720B/720C/720D}, Y_{720B/720C/720D})$ corresponding to first point 720B/720C/720D and the reference coordinate point $(X_{234/334/434}, Y_{234/334/434})$ corresponding to reference point 234/334/434. Controller 110 calculates a second length 726B/726C/726D extending between first point 720B/720C/720D and second point 722B/722C/722D based on the first coordinate point $(X_{720B/720C/720D}, Y_{720B/720C/720D})$ corresponding to first point 720B/720C/720D and the second coordinate point $(X_{234/334/434}, Y_{720B/720C/720D})$ corresponding to the location of second point 722B/722C/722D. Controller 110 may use, for example, the Pythagorean Theorem to calculate the first reference length as shown in Equation 1:

$$(\text{first length})^2 = (\text{second length})^2 + (\text{reference length})^2$$

$$(\text{reference length})^2 = (\text{first length})^2 - (\text{second length})^2$$

$$\text{reference length} = \sqrt{(\text{first length})^2 - (\text{second length})^2} \quad \text{Equation 1}$$

At block 703, controller 110 determines a third point and a fourth point related to the identified second feature of the first parked vehicle in the first row adjacent the feeder lane. Referring to FIG. 7B/7C/7D, using the data from external sensor 130, controller 110 sets a third point 730B/730C/730D at rear tire 214/314/414 (i.e., identified second feature) of first parked vehicle 210/310/410 in first row 203/303/403 adjacent feeder lane 201/301/401. Controller 110 may use the coordinate system determine a third coordinate point ($X_{730B/730C/730D}$, $Y_{730B/730C/730D}$) that corresponds to the location of third point 730B/730C/730D.

Controller 110 determines a fourth point 732B/732C/732D based on reference point 234/334/434 and third point 730B/730C/730D. Controller 110 determines fourth point 732B/732C/732D by generating a second right triangle (e.g., dot-dashed right triangle on the first side of the feeder lane) using reference point 234/334/434, third point 730B/730C/730D, and fourth point 732B/732C/732D such that a right angle of the second right triangle is located at an internal angle of fourth point 732B/732C/732D. Further, fourth point 732B/732C/732D is located closer to feeder lane 201/301/401 than first point 730B/730C/730D. Based on the third coordinate point ($X_{730B/730C/730D}$, $Y_{730B/730C/730D}$) corresponding to third point 730B/730C/730D and the reference coordinate point ($X_{234/334/434}$, $Y_{234/334/434}$) corresponding to reference point 234/334/434, controller 110 determines a fourth coordinate point ($X_{234/334/434}$, $Y_{730B/730C/730D}$) corresponding to the location of fourth point 732B/732C/732D.

At block 704, controller 110 calculates a second reference length associated with the second feature of the first parked vehicle in the first row of the feeder lane. For example, referring to FIG. 7B/7C/7D, controller 110 calculates a second reference length extending between reference point 234/334/434 and fourth point 732B/732C/732D based on, for example, the reference coordinate point ($X_{234/334/434}$, $Y_{234/334/434}$) corresponding to reference point 234/334/434 and fourth coordinate point ($X_{234/334/434}$, $Y_{730B/730C/730D}$) corresponding to the location of fourth point 732B/732C/732D.

Controller 110 calculates a third length 734B/734C/734D extending between reference point 234/334/434 and third point 730B/730C/730D based on, for example, the first coordinate point ($X_{730B/730C/730D}$, $Y_{730B/730C/730D}$) corresponding to third point 730B/730C/730D and the reference coordinate point ($X_{234/334/434}$, $Y_{234/334/434}$) corresponding to reference point 234/334/434. Controller 110 calculates a fourth length 736B/736C/736D extending between third point 730B/730C/730D and fourth point 732B/732C/732D based on the third coordinate point ($X_{730B/730C/730D}$, $Y_{730B/730C/730D}$) corresponding to first point 730B/730C/730D and the fourth coordinate point ($X_{234/334/434}$, $Y_{730B/730C/730D}$) corresponding to the location of fourth point 732B/732C/732D. In some embodiments, controller 110 may use, for example, the Pythagorean Theorem to calculate the second reference length as shown in Equation 1.

At block 705, controller 110 determines whether the calculated first reference length associated with the first parked vehicle (i.e., first parked vehicle 210/310/410) is shorter than the calculated second reference length associated with the first parked vehicle (i.e., first parked vehicle 210/310/410). When the calculated first reference length is shorter than the calculated second reference length (block 705=YES), process 700 proceeds to block 706 in which controller 110 determines that the direction of the first side of the feeder lane (e.g., feeder lane 201/301/401) as the first direction (i.e., the direction against the traveling direction of the own vehicle). When the calculated first reference length is not shorter than the calculated second reference length (block 705=NO), process 700 proceeds to block 707 in which controller 110 determines that the direction of the first side of the feeder lane (e.g., feeder lane 201/301/401) as the second direction (i.e., the direction along the traveling direction of the own vehicle).

At block 708, controller 110 determines a fifth point and a sixth point related to the identified first feature of the second parked vehicle in the second row adjacent the feeder lane. Referring to FIG. 7B/7C/7D, using the data from external sensor 130, controller 110 sets a fifth point 740B/740C/740D at front tire 222/322/422 (i.e., identified first feature) of second parked vehicle 220/320/420 in second row 205/305/405 adjacent feeder lane 201/301/401. Controller 110 may use the coordinate system to determine a fifth coordinate point ($X_{740B/740C/740D}$, $Y_{740B/740C/740D}$) that corresponds to the location of first point 740B/740C/740D.

Controller 110 determines a sixth point 742B/742C/742D based on reference point 234/334/434 and fifth point 740B/740C/740D. Controller 110 determines second point 742B/742C/742D by generating a third right triangle (e.g., dashed right triangle on the second side of the feeder lane) using reference point 234/334/434, fifth point 740B/740C/740D, and sixth point 742B/742C/742D such that a right angle of the third right triangle is located at an internal angle of sixth point 742B/742C/742D. Further, sixth point 742B/742C/742D is located closer to feeder lane 201/301/401 than fifth point 740B/740C/740D. Based on the fifth coordinate point ($X_{740B/740C/740D}$, $Y_{740B/740C/740D}$) corresponding to fifth point 740B/740C/740D and the reference coordinate point ($X_{234/334/434}$, $Y_{234/334/434}$) corresponding to reference point 234/334/434, controller 110 determines a sixth coordinate point ($X_{234/334/434}$, $Y_{740B/740C/740D}$) corresponding to the location of sixth point 742B/742C/742D.

At block 709, controller 110 calculates a third reference length associated with the first feature of the second parked vehicle in the second row of the feeder lane. For example, referring to FIG. 7B/7C/7D, controller 110 calculates a third reference length extending between reference point 234/334/434 and sixth point 742B/742C/742D based on, for example, the reference coordinate point ($X_{234/334/434}$, $Y_{234/334/434}$) corresponding to reference point 234/334/434 and the sixth coordinate point ($X_{234/334/434}$, $Y_{740B/740C/740D}$) corresponding to the location of sixth point 742B/742C/742D.

Controller 110 calculates a fifth length 744B/744C/744D extending between reference point 234/334/434 and fifth point 740B/740C/740D based on, for example, the fifth coordinate point ($X_{740B/740C/740D}$, $Y_{740B/740C/740D}$) corresponding to fifth point 740B/740C/740D and the reference coordinate point ($X_{234/334/434}$, $Y_{234/334/434}$) corresponding to reference point 234/334/434. Controller 110 calculates a sixth length 746B/746C/746D extending between fifth point 740B/740C/740D and sixth point 742B/742C/742D based on the fifth coordinate point ($X_{740B/740C/740D}$, $Y_{740B/740C/740D}$) corresponding to fifth point 740B/740C/740D and the sixth coordinate point ($X_{234/334/434}$, $Y_{740B/740C/740D}$) corresponding to the location of sixth point 742B/742C/742D. Controller 110 may use, for example, the Pythagorean Theorem to calculate the third reference length as shown in Equation 1.

At block 710, controller 110 determines a seventh point and an eighth point related to the identified second feature of the second parked vehicle in the second row adjacent the feeder lane. Referring to FIG. 7B/7C/7D, using the data from external sensor 130, controller 110 sets a seventh point 750B/750C/750D at rear tire 224 (i.e., identified second feature) of second parked vehicle 220/320/420 in second row 205/305/405 adjacent feeder lane 201/301/401. Controller 110 may use the coordinate system determine a seventh coordinate point $(X_{750B/750C/750D}, Y_{750B/750C/750D})$ that corresponds to the location of seventh point 750B/750C/750D.

Controller 110 determines an eighth point 752B/752C/752D based on reference point 234/334/434 and seventh point 750B/750C/750D. Controller 110 determines eighth point 752B/752C/752D by generating a fourth right triangle (e.g., dot-dashed right triangle on the second side of the feeder lane) using reference point 234/334/434, seventh point 750B/750C/750D, and eighth point 752B/752C/752D such that a right angle of the fourth right triangle is located at an internal angle of eighth point 752B/752C/752D. Further, eighth point 752B/752C/752D is located closer to feeder lane 201/301/401 than seventh point 750B/750C/750D. Based on the seventh coordinate point $(X_{750B/750C/750D}, Y_{750B/750C/750D})$ corresponding to seventh point 750B/750C/750D and the reference coordinate point $(X_{234/334/434}, Y_{234/334/434})$ corresponding to reference point 234/334/434, controller 110 determines an eighth coordinate point $(X_{234/334/434}, Y_{750B/750C/750D})$ corresponding to the location of eighth point 752B/752C/752D.

At block 711, controller 110 calculates a fourth reference length associated with the second feature of the second parked vehicle in the second row of the feeder lane. For example, referring to FIG. 7B/7C/7D, controller 110 calculates a fourth reference length extending between reference point 234/334/434 and eighth point 752B/752C/752D based on, for example, the reference coordinate point $(X_{234/334/434}, Y_{234/334/434})$ corresponding to reference point 234/334/434 and eighth coordinate point $(X_{234/334/434}, Y_{750B/750C/750D})$ corresponding to the location of eighth point 752B/752C/752D.

Controller 110 calculates a seventh length 754B/754C/754D extending between reference point 234/334/434 and seventh point 750B/750C/750D based on, for example, the seventh coordinate point $(X_{750B/750C/750D}, Y_{750B/750C/750D})$ corresponding to seventh point 750B/750C/750D and the reference coordinate point $(X_{234/334/434}, Y_{234/334/434})$ corresponding to reference point 234/334/434. Controller 110 calculates an eighth length 756B/756C/756D extending between seventh point 750B/750C/750D and eighth point 752B/752C/752D based on the seventh coordinate point $(X_{750B/750C/750D}, Y_{750B/750C/750D})$ corresponding to seventh point 750B/750C/750D and the eighth coordinate point $(X_{234/334/434}, Y_{750B/750C/750D})$ corresponding to the location of eighth point 752B/752C/752D. In some embodiments, controller 110 may use, for example, the Pythagorean Theorem to calculate the fourth reference length as shown in Equation 1.

At block 712, controller 110 determines whether the calculated third reference length associated with the second parked vehicle (i.e., second parked vehicle 220/320/420) is shorter than the calculated fourth reference length associated with the second parked vehicle (i.e., second parked vehicle 220/320/420). When the calculated third reference length is shorter than the calculated fourth reference length (block 712=YES), process 700 proceeds to block 713 in which controller 110 determines that the direction of the second side of the feeder lane (e.g., feeder lane 201/301/401) as the first direction (i.e., the direction against the traveling direction of the own vehicle). When the calculated third reference length is not shorter than the calculated fourth reference length (block 712=NO), process 700 proceeds to block 714 in which controller 110 determines that the direction of the second side of the feeder lane (e.g., feeder lane 201/301/401) as the second direction (i.e., the direction along the traveling direction of the own vehicle).

Figure 8A:
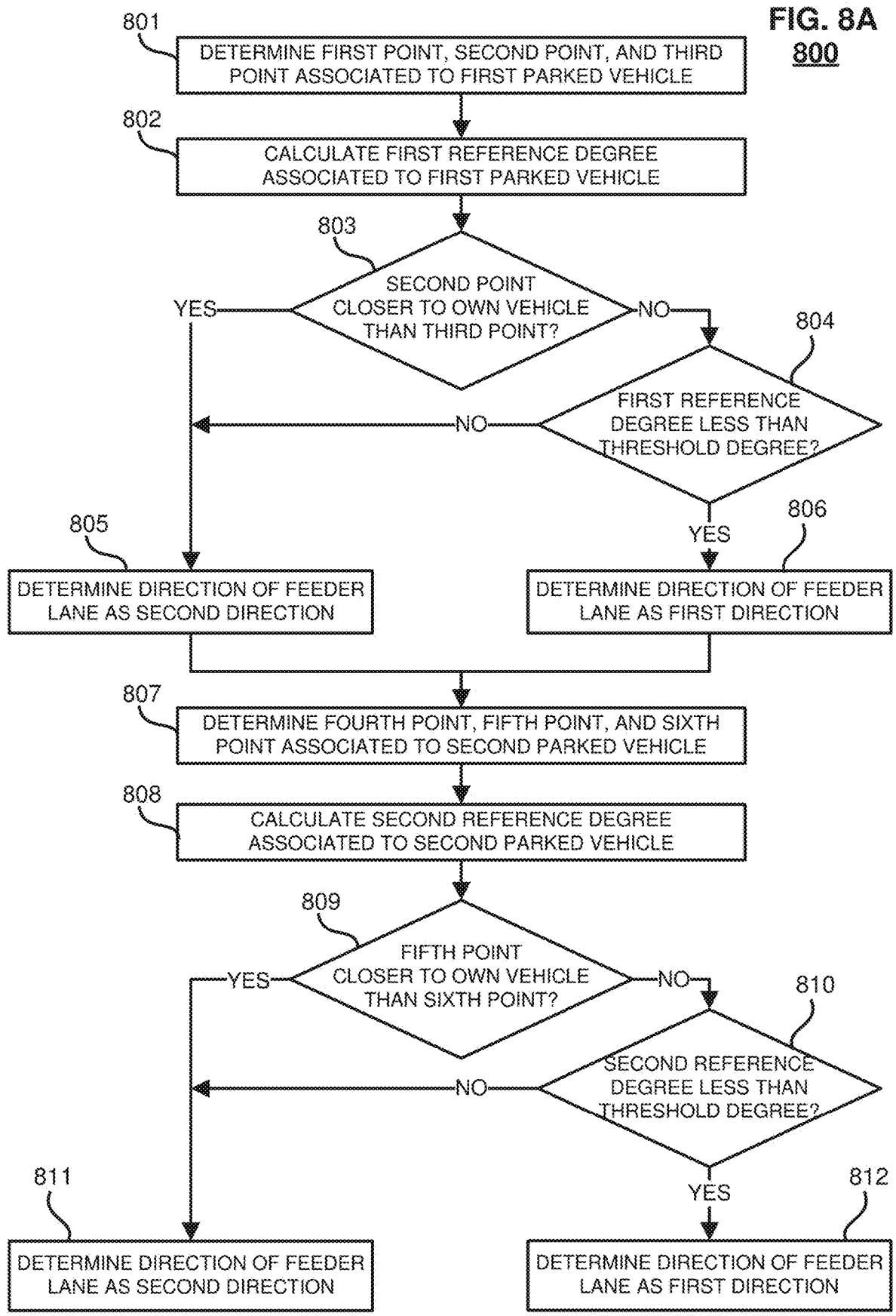
FIG. 8A shows a flowchart illustrating an example process for determining a direction of a first side and a direction of a second side of a feeder lane according to example aspects of the subject technology.

FIG. 8A shows a flowchart illustrating an example process 800 for determining a direction of the first side and a direction of the second side of the feeder lane (e.g., feeder lane 201/301/401) according to example aspects of the subject technology. For explanatory purposes, the various blocks of example process 800 are described herein with reference to the components and/or processes described herein. The one or more of the blocks of process 800 may be implemented, for example, by one or more components or processors of controller 110 of FIG. 1. In some implementations, one or more of the blocks may be implemented apart from other blocks, and by one or more different processors or controllers. Further, for explanatory purposes, the blocks of example process 800 are described as occurring in serial, or linearly. However, multiple blocks of example process 800 may occur in parallel. In addition, the blocks of example process 800 need not be performed in the order shown and/or one or more of the blocks of example process 800 need not be performed. The flowchart of FIG. 8A will be described using (I) FIG. 8B in which part of parking lot 200A depicted in FIG. 2A is reproduced; (II) FIG. 8C in which part of parking lot 300A is reproduced; and (III) FIG. 8D in which part of parking lot 400A is reproduced.

Figure 8B:
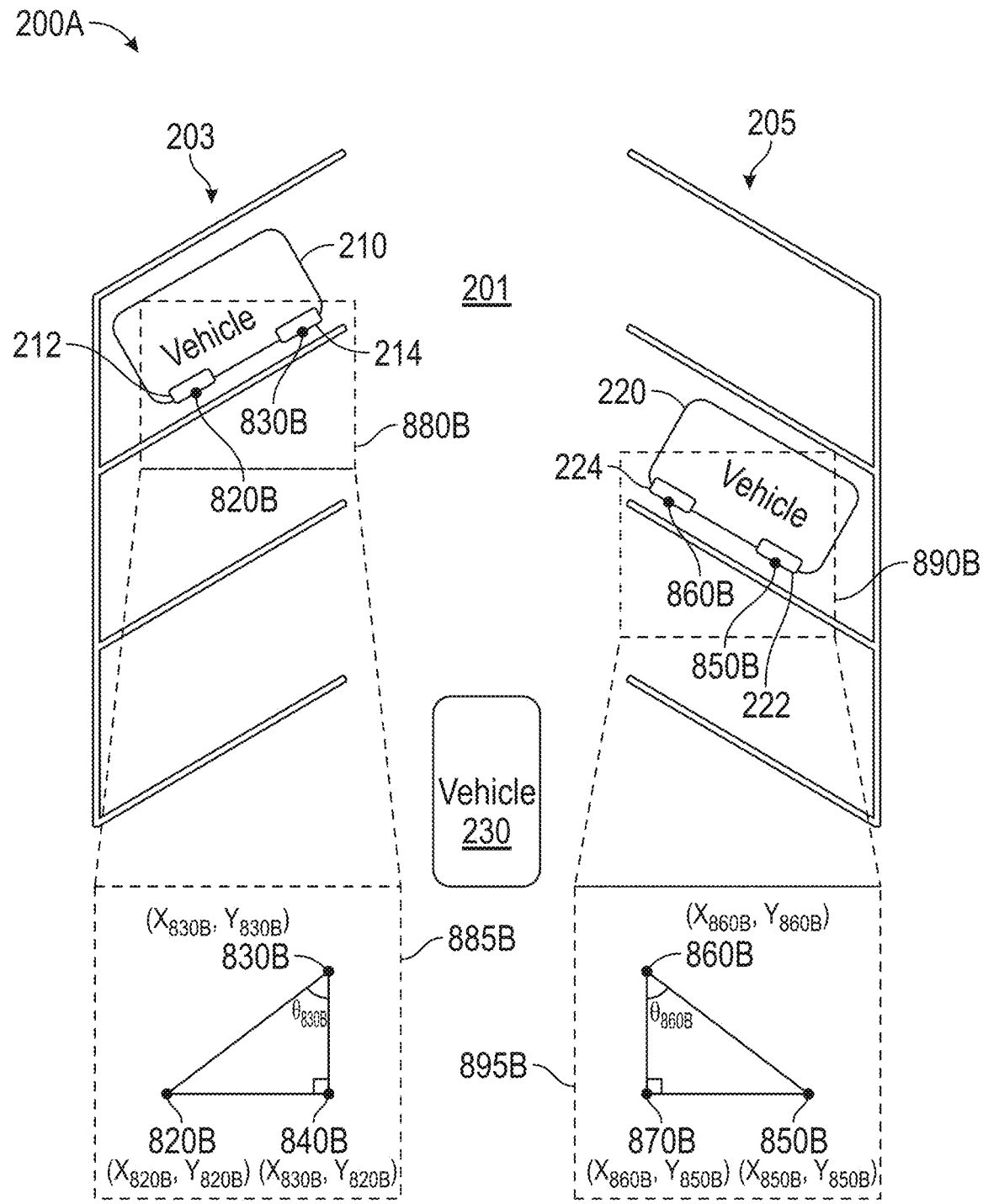
FIG. 8B depicts a top view of parking lot of FIG. 2A with measurements for determining a direction of a first side and a direction of a second side of a feeder lane according to the example process of FIG. 8A.
Figure 8C:
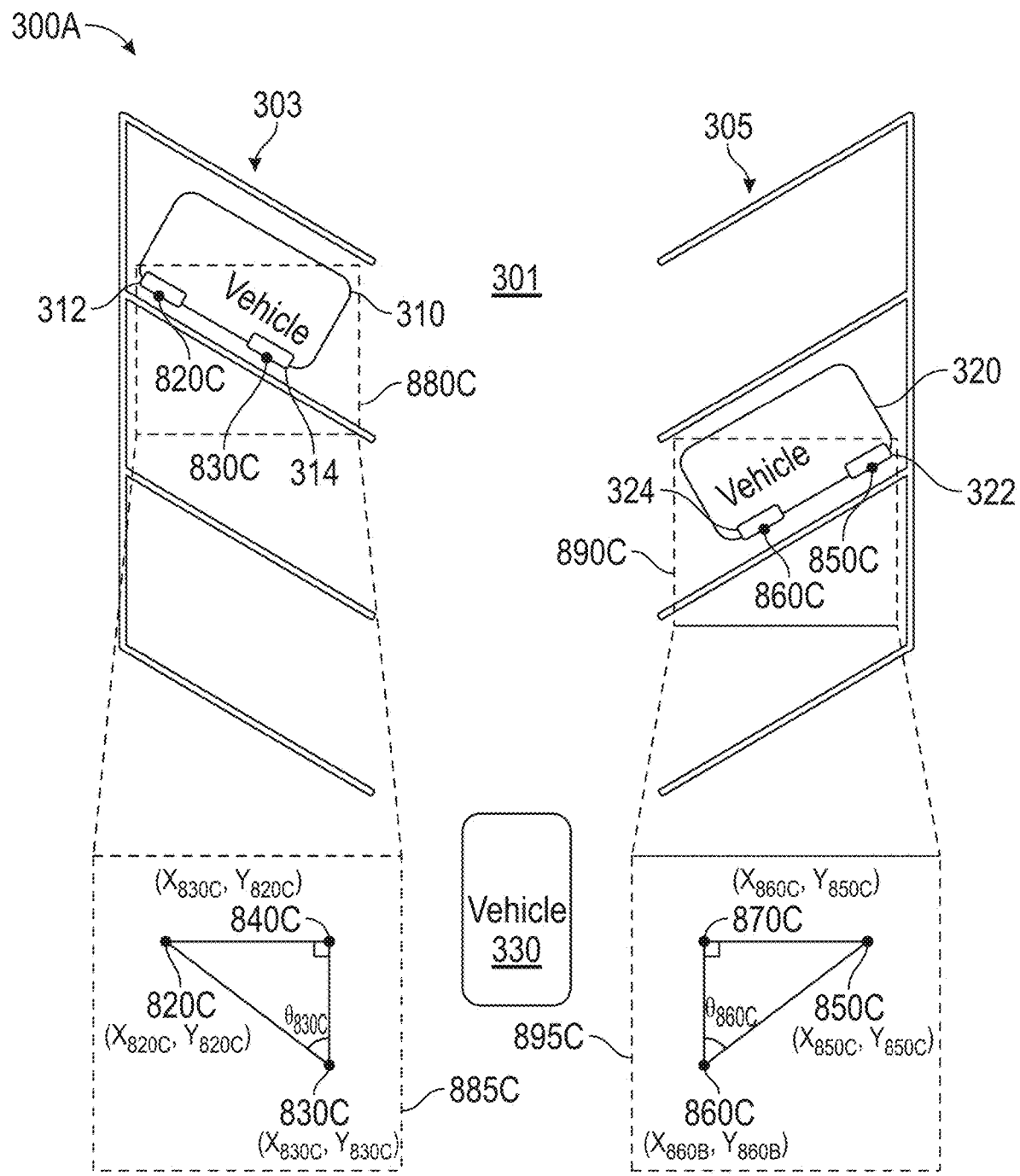
FIG. 8C depicts a top view of parking lot of FIG. 3A with measurements for determining a direction of a first side and a direction of a second side of a feeder lane according to the example process of FIG. 8A.
Figure 8D:
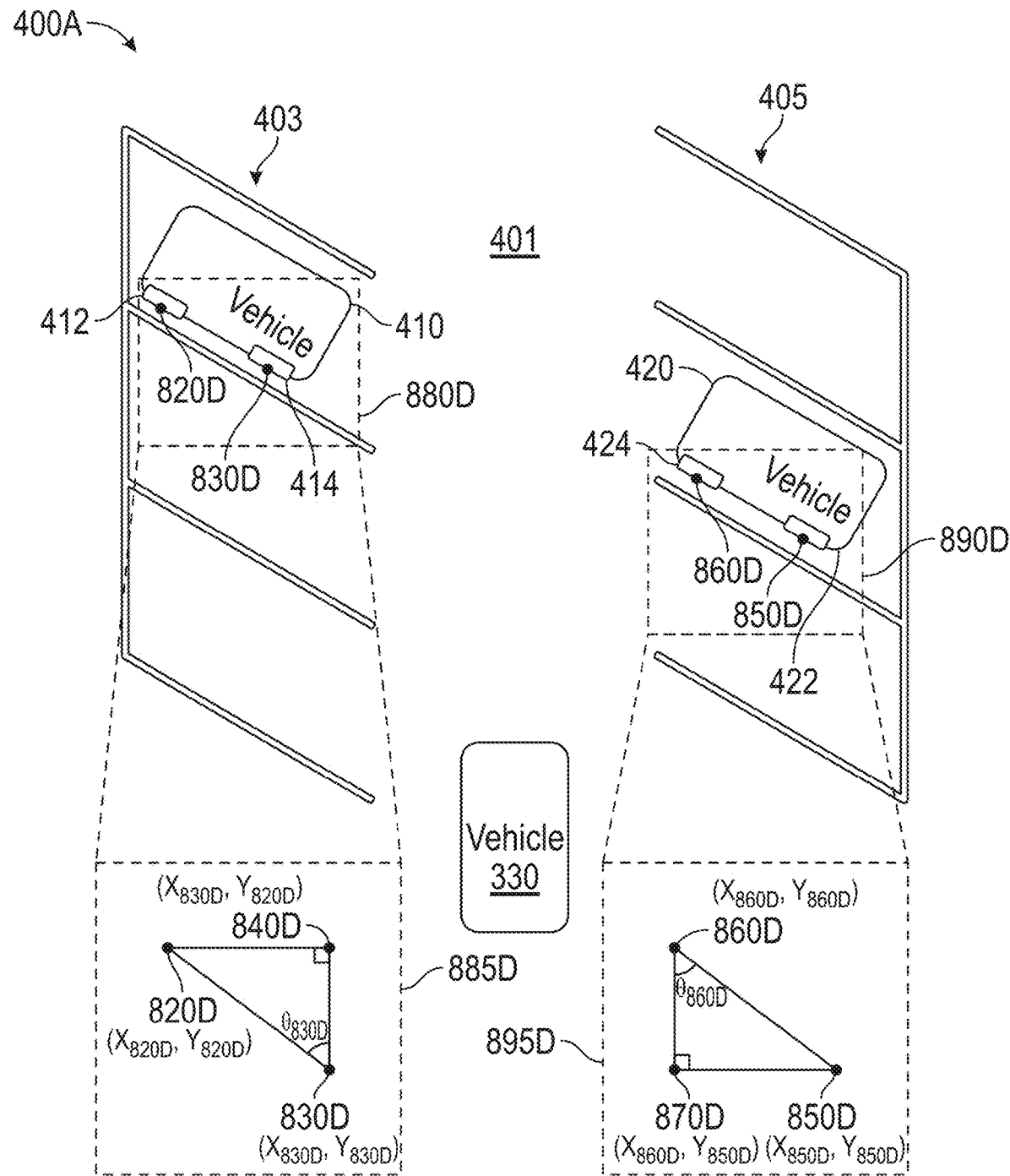
FIG. 8D depicts a top view of parking lot of FIG. 4A with measurements for determining a direction of a first side and a direction of a second side of a feeder lane according to the example process of FIG. 8A.

At block 801, controller 110 determines a first point, a second point, and a third point associated with the first parked vehicle in the first row adjacent the feeder lane. Referring to FIG. 8B/8C/8D, controller 110 sets a first point 820B/820C/820D at front tire 212/312/412 (i.e., identified first feature) of first parked vehicle 210/310/410 in first row 203/303/403 adjacent feeder lane 201/301/401. Controller 110 may use a coordinate system (e.g., three-dimensional coordinate system, two-dimensional coordinate system, etc.) to determine a first coordinate point $(X_{820B/820C/820D}, Y_{820B/820C/820D})$ that corresponds to the location of first point 820B/820C/820D.

Controller 110 sets a second point 830B/830C/830D at rear tire 214/314/414 (i.e., identified second feature) of first parked vehicle 210/310/410 in first row 203/303/403 adjacent feeder lane 201/301/401. Controller 110 may use the coordinate system to determine a second coordinate point $(X_{830B/830C/830D}, Y_{830B/830C/830D})$ that corresponds to the location of second point 830B/830C/830D.

Controller 110 determines a third point 840B/840C/840D based on first point 820B/820C/820D and second point 830B/830C/830D. Controller 110 determines third point 840B/840C/840D by generating a first right triangle using first point 820B/820C/820D, second point 830B/830C/830D, and third point 840B/840C/840D such that a right angle of the first right triangle is located at an internal angle of third point 840B/840C/840D. Further, third point 840B/840C/840D is located closer to feeder lane 201/301/401 than first point 820B/820C/820D. Based on the first coordinate point $(X_{820B/820C/820D}, Y_{820B/820C/820D})$ corresponding to first point 820B/820C/820D and the second coordinate point $(X_{830B/830C/830D}, Y_{830B/830C/830D})$ corresponding to second point 830B/830C/830D, controller 110 determines a third coordinate point $(X_{830B/830C/830D}, Y_{820B/820C/820D})$ corresponding to the location of third point 840B/840C/840D.

At block 802, controller 110 determines a first reference degree θ1 associated with the first parked vehicle in the first row adjacent the feeder lane. For example, referring to FIG. 8B/8C/8D, an enlarged view of a region 880B/880C/880D is illustrated in a box 885B/885C/885D. For the purpose of simplicity, the components (front tire 212/312/412, rear tire 214/314/414, other part of first parked vehicle 210/310/410) other than first point 820B/820C/820D and second point 830B/830C/830D are omitted in box 885B/885C/885D. Controller 110 determines, as a first reference degree, a degree of an internal angle at the second point 830B/830C/830D. For example, controller 110 calculates a length $a_1$ extending between first point 820B/820C/820D and third point 840B/840C/840D, and, a length $b_1$ extending between second point 830B/830C/830D and third point 840B/840C/840D, and a length $c_1$ extending between first point 820B/820C/820D and second point 830B/830C/830D using Equations 2, 3, and 4, respectively:

$$a_1 = |X_{first\ point} - X_{second\ point}| \quad \text{Equation 2}$$

$$b_1 = |Y_{first\ point} - Y_{second\ point}| \quad \text{Equation 3}$$

$$c_1 = \sqrt{a_1^2 + b_1^2} = \quad \text{Equation 4}$$

$$\sqrt{(|X_{first\ point} - X_{second\ point}|)^2 + (|Y_{first\ point} - Y_{second\ point}|)^2}$$

For example, $X_{first\ point}$ is the X value (i.e., $X_{820B/820C/820D}$) of first coordinate point ($X_{820B/820C/820D}$, $Y_{820B/820C/820D}$) associated with first point 820B/820C/820D, and $X_{second\ point}$ is the X value (i.e., $X_{830B/830C/830D}$) of second coordinate point ($X_{830B/830C/830D}$, $Y_{830B/830C/830D}$) associated with second point 830B/830C/830D. For example, $Y_{first\ point}$ is the Y value (i.e., $Y_{820B/820C/820D}$) of first coordinate point ($X_{820B/820C/820D}$, $Y_{820B/820C/820D}$) associated with first point 820B/820C/820D, and $Y_{second\ point}$ is the Y value (i.e., $Y_{830B/830C/830D}$) of second coordinate point ($X_{830B/830C/830D}$, $Y_{830B/830C/830D}$) associated with second point 830B/830C/830D.

Controller 110 uses Equation 5 to calculate the first reference degree θ1:

$$\theta_1 = \cos^{-1}\left(\frac{b_1}{c_1}\right) = \cos^{-1} \quad \text{Equation 5}$$

$$\left(\frac{|Y_{first\ point} - Y_{second\ point}|}{\sqrt{(|X_{first\ point} - X_{second\ point}|)^2 + (|Y_{first\ point} - Y_{second\ point}|)^2}}\right)$$

For example, controller 110 calculates, as a first reference degree θ1 of first parked vehicle 210/310/410, a degree $\theta_{830B/830C/830D}$ of 830B/830C/830D using Equation 5 with $X_{820B/820C/820D}$ for $X_{first\ point}$, $X_{830B/830C/830D}$ for $X_{second\ point}$, $Y_{820B/820C/820D}$ for $Y_{first\ point}$, and $Y_{830B/830C/830D}$ for $Y_{second\ point}$.

At block 803, controller 110 determines whether the second point is closer to the own vehicle than the third point. In some embodiments, controller 110 may subtract the Y value (i.e., $Y_{820B/820C/820D}$) of third point 840B/840C/840D from the Y value (i.e., $Y_{830B/830C/830D}$) of second point 830B/830C/830D (i.e., $Y_{830B/830C/830D} - Y_{820B/820C/820D}$). For example, if the second coordinate point ($X_{830B/830C/830D}$, $Y_{830B/830C/830D}$) associated with second point 830B/830C/830D as (0, 0) such that the third coordinate point associated with third point 840B/840C/840D becomes (0, $Y_{820B/820C/820D}$) from ($X_{830B/830C/830D}$, $Y_{820B/820C/820D}$), controller 110 subtracts the Y value (i.e., $Y_{820B/820C/820D}$) of third point 840B/840C/840D from the Y value (i.e., 0) of second point 830B/830C/830D (i.e., 0-$Y_{820B/820C/820D}$). When the subtraction result is a negative value, controller 110 determines that the second point is closer to the own vehicle than the third point. When the subtraction result is a positive value, controller 110 determines that the second point is not closer to the own vehicle than the third point.

In some embodiments, controller 110 may set third point 840B/840C/840D as the origin point of the first right triangle. That is, controller 110 may set the third coordinate point ($X_{830B/830C/830D}$, $Y_{820B/820C/820D}$) associated with third point 840B/840C/840D as (0, 0) such that controller 110 updates the first coordinate point associated with first point 820B/820C/820D from ($X_{820B/820C/820D}$, $Y_{820B/820C/820D}$) to ($X_{820B/820C/820D}$, 0) and updates the second coordinate point associated with second point 830B/830C/830D from ($X_{830B/830C/830D}$, $Y_{830B/830C/830D}$) to (0, $Y_{830B/830C/830D}$). Controller 110 may then verify whether the Y value (i.e., $Y_{830B/830C/830D}$) of the updated second coordinate point associated with second point 830B/830C/830D is a negative value or a positive value. When the Y value (i.e., $Y_{830B/830C/830D}$) of the updated second coordinate point associated with second point 830B/830C/830D is a negative value, controller 110 determines that the second point is closer to the own vehicle than the third point. When the Y value (i.e., $Y_{830B/830C/830D}$) of the updated second coordinate point associated with second point 830B/830C/830D is a positive value, controller 110 determines that the second point is not closer to the own vehicle than the third point.

When the second point is determined to be not closer to the own vehicle than the third point (block 803=NO), process 800 proceeds to block 804. When the second point is determined to be closer to the own vehicle than the third point (block 803=YES), process 800 proceeds to block 805.

At block 804, controller 110 determines whether the first reference degree $\theta_1$ determined in block 802 is less than a threshold degree. The threshold degree may be a predetermined degree (i.e., 75 degrees) based on typical designs of angle parking. For example, controller 110 determines whether the first reference degree $\theta_1$ is less than the threshold degree to verify that the first parked vehicle is a vehicle parked in an angle parking space to be entered from the other end of the feeder lane and not a vehicle that was not parked straight in a perpendicular parking space. This prevents controller 110 to erroneously provide warning to output device 140 to warn the driver of a wrong way driving through the feeder lane.

When the first reference degree $\theta_1$ is determined to be not less than the threshold degree (block 804=NO), process 800 proceeds to block 805 in which controller 110 determines that the direction of the first side of the feeder lane (e.g., feeder lane 201/301/401) as the second direction (i.e., the direction along the traveling direction of the own vehicle). When the first reference degree $\theta_1$ is determined to be less than the threshold degree (block 804=YES), process 800 proceeds to block 806 in which controller 110 determines that the direction of the first side of the feeder lane (e.g., feeder lane 201/301/401) as the first direction (i.e., the direction against the traveling direction of the own vehicle).

At block 807, controller 110 determines a fourth point, a firth point, and a sixth point associated with the second parked vehicle in the second row adjacent the feeder lane. Referring to FIG. 8B/8C/8D, controller 110 sets a fourth point 850B/850C/850D at front tire 222/322/422 (i.e., identified first feature) of second parked vehicle 220/320/420 in second row 205/305/405 adjacent feeder lane 201/301/401. Controller 110 may use the coordinate system to determine a fourth coordinate point ($X_{850B/850C/850D}$, $Y_{850B/850C/850D}$) that corresponds to the location of fourth point 850B/850C/850D.

Controller 110 sets a fifth point 860B/860C/860D at rear tire 224/324/424 (i.e., identified second feature) of second parked vehicle 220/320/420 in second row 205/305/405 adjacent feeder lane 201/301/401. Controller 110 may use the coordinate system to determine a fifth coordinate point ($X_{860B/860C/860D}$, $Y_{860B/860C/860D}$) that corresponds to the location of fifth point 860B/860C/860D.

Controller 110 determines a sixth point 870B/870C/870D based on fourth point 850B/850C/850D and fifth point 860B/860C/860D. Controller 110 determines sixth point 870B/870C/870D by generating a second right triangle using fourth point 850B/850C/850D, fifth point 860B/860C/860D, and sixth point 870B/870C/870D such that a right angle of the second right triangle is located at an internal angle of sixth point 870B/870C/870D. Further, sixth point 870B/870C/870D is located closer to feeder lane 201/301/401 than fourth point 850B/850C/850D. Based on the fourth coordinate point ($X_{850B/850C/850D}$, $Y_{850B/850C/850D}$) corresponding to fourth point 850B/850C/850D and the fifth coordinate point ($X_{860B/860C/860D}$, $Y_{860B/860C/860D}$) corresponding to fifth point 860B/860C/860D, controller 110 determines a sixth coordinate point ($X_{860B/860C/860D}$, $Y_{850B/850C/850D}$) corresponding to the location of sixth point 870B/870C/870D.

At block 808, controller 110 determines a second reference degree θ2 associated with the second parked vehicle in the second row adjacent the feeder lane. For example, referring to FIG. 8B/8C/8D, an enlarged view of a region 890B is illustrated in a box 895B/895C/895D. For the purpose of simplicity, the components (front tire 222, rear tire 224, other part of second parked vehicle 220/320/420) other than fourth point 850B/850C/850D and fifth point 860B/860C/860D are omitted in box 895B/895C/895D. Referring to FIG. 8B/8C/8D, controller 110 determines, as the second reference degree $θ_2$, a degree $θ_{860B/860C/860D}$ of an internal angle at the fifth point 860B/860C/860D. For example, controller 110 calculates a length $a_2$ extending between fourth point 850B/850C/850D and sixth point 870B/870C/870D, a length $b_2$ extending between fifth point 860B/860C/860D and sixth point 870B/870C/870D, and a length $c_2$ extending between fourth point 850B/850C/850D and fifth point 860B/860C/860D using Equations 2, 3, and 4, respectively. Controller 110 uses Equation 5 to calculate the first reference degree $θ_2$. For example, controller 110 calculates, as the second reference degree $θ_2$ of second parked vehicle 220/320/420, the degree $θ_{860B/860C/860D}$ at fifth point 860B/860C/860D (i.e., an internal angle at fifth point 860B/860C/860D) using Equation 5 with $X_{850B/850C/850D}$ for $X_{first\ point}$, $X_{860B/860C/860D}$ for $X_{second\ point}$, $Y_{850B/850C/850D}$ for $Y_{first\ point}$, and $Y_{860B/860C/860D}$ for $Y_{second\ point}$.

At block 809, controller 110 determines whether the fifth point is closer to the own vehicle than the sixth point. Similar to block 803, controller 110 may subtract the Y value (i.e., $Y_{850B/850C/850D}$) of sixth point 870B/870C/870D from the Y value (i.e., $Y_{860B/860C/860D}$) of fifth point 860B/860C/860D (i.e., $Y_{860B/860C/860D} - Y_{850B/850C/850D}$) to determine whether fifth point 860B/860C/860D is closer to the own vehicle than sixth point 870B/870C/870D. In some embodiments, controller may set the sixth coordinate point of sixth point 870B/870C/870D as the origin point of the second right triangle and update the fourth and fifth coordinate points of fourth point 850B/850C/850D and fifth point 860B/860C/860D to determine whether fifth point 860B/ 860C/860D is closer to the own vehicle than sixth point 870B/870C/870D. When the fifth point is determined to be not closer to the own vehicle than the sixth point (block 809=NO), process 800 proceeds to block 810. When the fifth point is determined to be closer to the own vehicle than the sixth point (block 809=YES), process 800 proceeds to block 811.

At block 810, controller 110 determines whether the second reference degree $θ_2$ determined in block 808 is less than the threshold degree. When the second reference degree $θ_2$ is determined to be not less than the threshold degree (block 810=NO), process 800 proceeds to block 811 in which controller 110 determines that the direction of the second side of the feeder lane (e.g., feeder lane 201/301/401) as the second direction (i.e., the direction along the traveling direction of the own vehicle). When the second reference degree $θ_2$ is determined to be less than the threshold degree (block 810=YES), process 800 proceeds to block 812 in which controller 110 determines that the direction of the second side of the feeder lane (e.g., feeder lane 201/301/401) as the first direction (i.e., the direction against the traveling direction of the own vehicle).

Returning to block 505 of process 500 in FIG. 5, with respect to feeder lane 201 of parking lot 200A in FIG. 2A, the direction of the first side of feeder lane 201 is determined to be the first direction which is against the traveling direction of own vehicle 230 according to process 600 of FIG. 6, process 700 of FIG. 7, and process 800 of FIG. 8. In block 506 of process 500 in FIG. 5, the direction of the second side of feeder lane 201 in parking lot 200A is determined to be the first direction which is against the traveling direction of own vehicle 230 according to process 600 of FIG. 6, process 700 of FIG. 7, and/or process 800 of FIG. 8.

According to blocks 505 and 506 of FIG. 5, with respect to feeder lane 301 of parking lot 300A in FIG. 3A, the direction of the first side of feeder lane 301 is determined to be the second direction which is the same direction as the traveling direction of own vehicle 330, and the direction of the second side of the feeder lane 301 is also determined to be the second direction which is the same direction as the traveling direction of own vehicle 330. According to blocks 505 and 506 of FIG. 5, with respect to feeder lane 401 of parking lot 400A in FIG. 4A, the direction of the first side of feeder lane 401 is determined to be the second direction which is the same direction as the traveling direction of own vehicle 430, and the direction of the second side of the feeder lane 401 is determined to be the first direction which is against the traveling direction of own vehicle 430.

Returning to process 500 of FIG. 5, after the direction of the first side of the feeder lane (e.g., feeder lane 201/301/401) is determined in block 505 and the direction of the second side of the feeder lane is determined in block 506, process 500 proceeds to block A in FIG. 9.

FIG. 9 shows a flowchart illustrating an example process 900 for determining a direction of the feeder lane (e.g., feeder lane 201/301/401) according to example aspects of the subject technology. For explanatory purposes, the various blocks of example process 900 are described herein with reference to the components and/or processes described herein. The one or more of the blocks of process 900 may be implemented, for example, by one or more components or processors of controller 110 of FIG. 1. In some implementations, one or more of the blocks may be implemented apart from other blocks, and by one or more different processors or controllers. Further, for explanatory purposes, the blocks of example process 900 are described as occurring in serial, or linearly. However, multiple blocks of example process 900 may occur in parallel. In addition, the blocks of example process 900 need not be performed in the order shown and/or one or more of the blocks of example process 900 need not be performed.

Beginning at block A, process 900 proceeds to block 901. At block 901, controller 110 determines whether the direction of the first side of the feeder lane determined in block 505 of FIG. 5 matches the direction of the second side of the feeder lane determined in block 506 of FIG. 5. When the determined direction of the first side of the feeder lane matches the determined direction of the second side of the feeder lane (block 901=YES), process 900 proceeds to block 902. When the determined direction of the first side of the feeder lane does not match the determined direction of the second side of the feeder lane (block 901=NO), process 900 proceeds to block 903.

With respect to parking lot 200A in FIG. 2A, the direction of the first side of feeder lane 201 is determined to be the first direction (i.e., the direction against the traveling direction of the own vehicle) and the direction of the second side of feeder lane 201 is also determined to be the first direction. Accordingly, controller 110 determines that the determined direction of the first side of the feeder lane matches the determined direction of the second side of the feeder lane (block 901=YES), process 900 proceeds to block 902.

With respect to parking lot 300A in FIG. 3A, the direction of the first side of feeder lane 301 is determined to be the second direction (i.e., the direction along the traveling direction of the own vehicle) and the direction of the second side of feeder lane 301 is also determined to be the second direction. Accordingly, controller 110 determines that the determined direction of the first side of the feeder lane matches the determined direction of the second side of the feeder lane (block 901=YES), process 900 proceeds to block 902.

With respect to parking lot 400A in FIG. 4A, the direction of the first side of feeder lane 401 is determined to be the second direction (i.e., the direction along the traveling direction of the own vehicle) and the direction of the second side of feeder lane 401 is determined to be the first direction (i.e., the direction against the traveling direction of the own vehicle). Accordingly, controller 110 determines that the determined direction of the first side of the feeder lane does not match the determined direction of the second side of the feeder lane (block 901=NO), process 900 proceeds to block 903.

At block 902, controller 110 determines that the feeder lane is an one-way feeder lane in which all traffic through the one-way feeder lane are to enter from one end of the feeder lane and exit from the other end of the feeder lane. For both of parking lot 200A in FIG. 2A and parking lot 300A in FIG. 3A, controller 110 determines that the feeder lane is a one-way feeder lane. Process 900 proceeds from block 902 to block 904.

At block 903, controller 110 determines that the feeder lane is a two-way feeder lane (e.g., bidirectional) in which traffic may enter and exit from either end of the feeder lane. With respect to parking lot 400A in FIG. 4A, controller 110 determines that the traffic direction of feeder lane 401 the two-way traffic. Process 900 proceeds from block 903 to block B in FIG. 10.

At block 904, controller 110 determines the traffic direction of the one-way feeder lane. With respect to parking lot 200A in FIG. 2A, since the directions of both the first side and the second side of feeder lane 201 are the first direction (i.e., the direction against the traveling direction of the own vehicle) based on the determination results of process 500 in FIG. 5, controller 110 determines that the traffic direction of feeder lane 201 (i.e., one-way feeder lane) is the first direction. With respect to parking lot 300A in FIG. 3A, since the directions of both the first side and the second side of feeder lane 301 are the second direction (i.e., the direction along the traveling direction of the own vehicle) based on the determination results of process 500 in FIG. 5, controller 110 determines that the traffic direction of feeder lane 301 (i.e., one-way feeder lane) is the second direction. Process 900 proceeds from block 904 to block 905.

At block 905, controller 110 determines whether the direction of the feeder lane matches the traveling direction of the own vehicle. When the direction of the feeder lane matches the traveling direction of the own vehicle (block 905=YES), process 900 ends. When the direction of the feeder lane does not match the traveling direction of the own vehicle (block 905=NO), process 900 proceeds to block 906 in which controller 110 controls output device 140 to output warning. The warning may include notifying the driver that the vehicle is traveling in a wrong direction through the feeder lane. For example, at block 906, controller 110 may control monitor 142 to display a visual warning. In some embodiments, controller may control speaker 144 to output an audio warning.

With respect to parking lot 200A in FIG. 2A, the direction of feeder lane 201 is the first direction (i.e., the direction against the traveling direction of the own vehicle) while the traveling direction (as shown by arrow 232 in FIG. 2A) of own vehicle 230 is the second direction. Controller 110, therefore, determines that the direction of feeder lane 201 does not match the traveling direction (i.e., arrow 232) of own vehicle 230 (block 905=NO), and output warning via output device 140 to alert the driver of own vehicle 230 about the wrong way driving.

With respect to parking lot 300A in FIG. 3A, the direction of feeder lane 301 is the second direction (i.e., the direction along the traveling direction of the own vehicle) and the traveling direction (as shown by arrow 332 in FIG. 3A) of own vehicle 330 is also the second direction. Controller 110, therefore, determines that the direction of feeder lane 201 matches the traveling direction (i.e., arrow 332) of own vehicle 330 (block 905=YES). Since the traveling direction of own vehicle 330 adheres to the designated traveling direction of feeder lane 301, process 900 ends without outputting warning on output device 140.

Referring back to block 903 of process 900, after controller 110 determines that the traffic direction of the feeder lane is designated for two-way traffic, process 900 proceeds from block 903 to block B in FIG. 10.

FIG. 10 shows a flowchart illustrating an example process 1000 for determining a direction of the feeder lane (e.g., feeder lane 201) according to example aspects of the subject technology. For explanatory purposes, the various blocks of example process 1000 are described herein with reference to the components and/or processes described herein. The one or more of the blocks of process 1000 may be implemented, for example, by one or more components or processors of controller 110 of FIG. 1. In some implementations, one or more of the blocks may be implemented apart from other blocks, and by one or more different processors or controllers. Further, for explanatory purposes, the blocks of example process 1000 are described as occurring in serial, or linearly. However, multiple blocks of example process 1000 may occur in parallel. In addition, the blocks of example process 1000 need not be performed in the order shown and/or one or more of the blocks of example process 1000 need not be performed.

Beginning at block B, process 1000 proceeds to block 1001. At block 1001, controller 110 determines whether the own vehicle is traveling in a left-hand-traffic designated area or a right-hand-traffic designated area. In the left-hand-traffic designated area, when a vehicle travels a two-way traffic street, the vehicle is required to travel on the left-hand side of the street. For example, the United States and Germany are some of the countries that require vehicles to travel on the right-hand side of the streets. In the right-hand-traffic designated area, when the vehicle travels the two-way traffic street, the vehicle is required to travel on the right-hand side of the street. For example, Australia, Japan, and United Kingdom are some of the countries that require vehicles to travel on the right-hand side of the streets.

When controller 110 determines that the own vehicle is traveling in the left-hand-traffic designated area (block 1001=LEFT-HAND-TRAFFIC), process 1000 proceeds to block 1003 in which controller 110 controls output device 140 to output a recommendation to drive on the left-hand side through the feeder lane. When controller 110 determines that the own vehicle is traveling in the right-hand-traffic designated area (block 1001=RIGHT-HAND-TRAFFIC), process 1000 proceeds to block 1005 in which controller 110 controls output device 140 to output a recommendation to stay on the right-hand side through the feeder lane.

With respect to parking lot 400A in FIG. 4A, parking lot 400A is located in the left-hand-traffic designated area (block 1001=LEFT-HAND-TRAFFIC). Controller 110, therefore, controls output device 140 to output a recommendation to drive on the left-hand side (i.e., first side) of the feeder lane.

Figure 11:
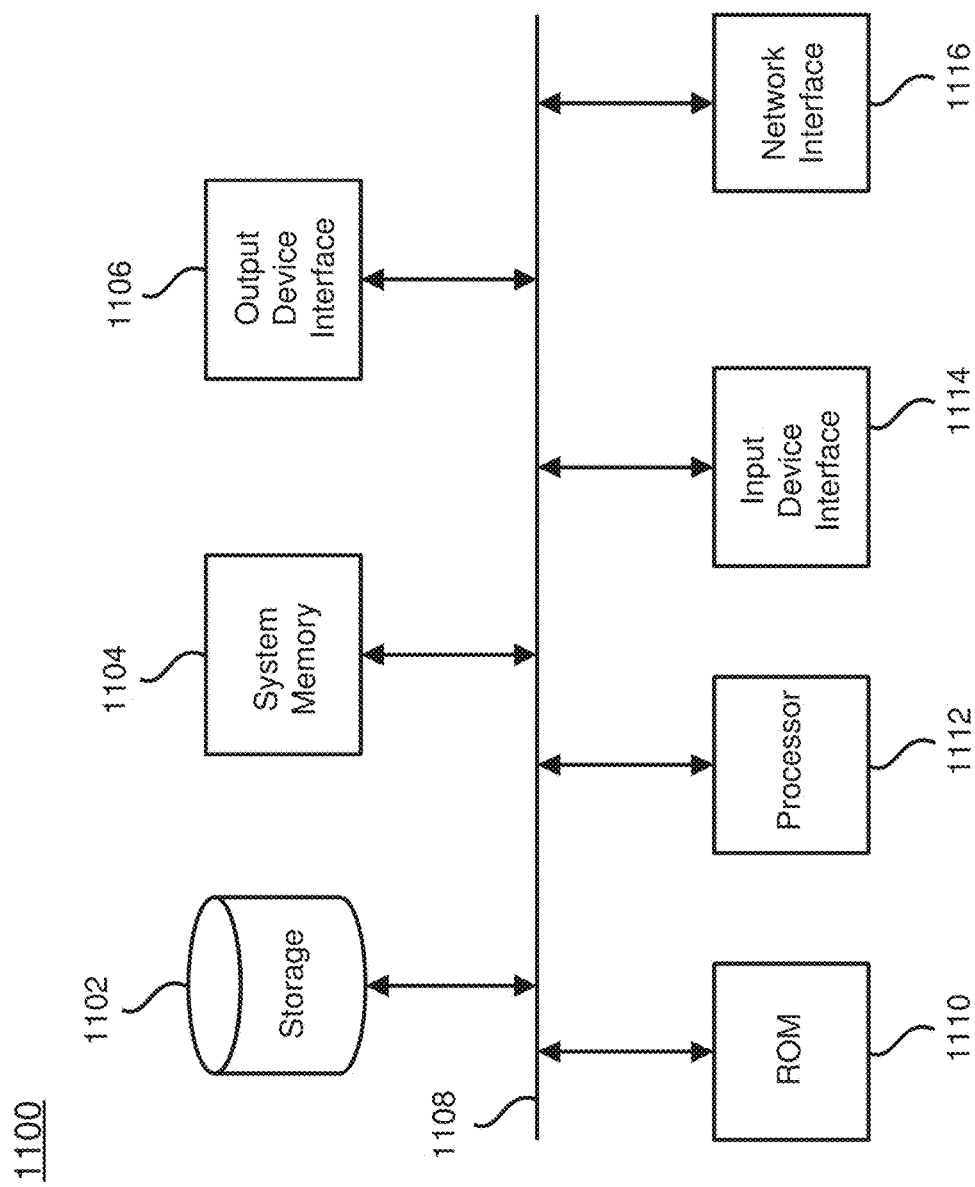
FIG. 11 is a block diagram illustrating an example electric system with which the parking lot direction warning system of FIG. 1 can be implemented according to example aspects of the subject technology.

FIG. 11 is a block diagram illustrating an exemplary electronic system 1100 with which controller 110 of FIG. 1 can be implemented to control the vehicle. In certain aspects, the electronic system 1100 may be implemented using hardware or a combination of software and hardware, either in a dedicated electronic control unit (ECU), or integrated into another entity, or distributed across multiple entities. Electronic system 1100 (e.g., controller 110) includes a bus 1108, a processor 1112, a system memory 1104, a read-only memory (ROM) 1110, a permanent storage device 1102, an input device interface 1114, an output device interface 1106, and a network interface 1116.

Bus 1108 collectively represents all system, peripheral, and chipset buses that communicatively connect the numerous internal devices of electronic system 1100. For instance, bus 1108 communicatively connects processor 1112 with ROM 1110, system memory 1104, and permanent storage device 1102.

From these various memory units, processor 1112 retrieves instructions to execute and data to process in order to execute the processes of the subject disclosure. The processor 1112 can be a single processor or a multi-core processor in different implementations.

ROM 1110 stores static data and instructions that are needed by processor 1112 and other modules of the electronic system. Permanent storage device 1102, on the other hand, is a read-and-write memory device. This device is a non-volatile memory unit that stores instructions and data even when electronic system 1100 is off. Some implementations of the subject disclosure use a mass-storage device (for example, a magnetic or optical disk, or flash memory) as permanent storage device 1102.

Other implementations use a removable storage device (for example, a flash drive) as permanent storage device 1102. Like permanent storage device 1102, system memory 1104 is a read-and-write memory device. However, unlike storage device 1102, system memory 1104 is a volatile read-and-write memory, such as a random access memory. System memory 1104 stores some of the instructions and data that the processor needs at runtime. In some implementations, the processes of the subject disclosure are stored in system memory 1104, permanent storage device 1102, or ROM 1110. For example, the various memory units include instructions for displaying graphical elements and identifiers associated with respective applications, receiving a predetermined user input to display visual representations of shortcuts associated with respective applications, and displaying the visual representations of shortcuts. From these various memory units, processor 1112 retrieves instructions to execute and data to process in order to execute the processes of some implementations.

Bus 1108 also connects to input and output device interfaces 1114 and 1106. Input device interface 1114 enables the user to communicate information and select commands to the electronic system. Input devices used with input device interface 1114 include, for example, alphanumeric keyboards and pointing devices (also called "cursor control devices"). Output device interfaces 1106 enables, for example, the display of images generated by the electronic system 1100 (e.g., accelerator pedal maps). Output devices used with output device interface 1106 include, for example, display devices, for example, cathode ray tubes (CRT) or liquid crystal displays (LCD). Some implementations include devices, for example, a touchscreen that functions as both input and output devices.

Finally, as shown in FIG. 11, bus 1108 also couples electronic system 1100 to a network (not shown) through a network interface 1116. In this manner, the computer can be a part of a network of computers (for example, a CAN, a LAN, a WAN, or an Intranet, or a network of networks, for example, the Internet). Any or all components of electronic system 1100 can be used in conjunction with the subject disclosure.

Many of the above-described features and applications are implemented as software processes that are specified as a set of instructions recorded on a computer readable storage medium (also referred to as computer readable medium). When these instructions are executed by one or more processors (e.g., one or more processors, cores of processors, or other processing units), they cause the processors to perform the actions indicated in the instructions. Examples of computer readable media include, but are not limited to, magnetic media, optical media, electronic media, etc. The computer readable media does not include carrier waves and electronic signals passing wirelessly or over wired connections.

In this specification, the term "software" is meant to include, for example, firmware residing in read-only memory or other form of electronic storage, or applications that may be stored in magnetic storage, optical, solid state, etc., which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Such electronic components are implemented by circuitry including, for example, one or more semiconductor integrated circuits. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself. ASICs and FPGAs are also implemented by semiconductor integrated circuits.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It may be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor may they be interpreted in such a way.

What is claimed is:

1. A computer-implemented method comprising:
    detecting that an own vehicle enters a feeder lane in a parking facility;
    receiving, from an external sensor mounted on the own vehicle, first data of a first parked vehicle parked in a first row of parking spaces adjacent the feeder lane and second data of a second parked vehicle parked in a second row of parking spaces adjacent the feeder lane;
    identifying, from the received first data of the first parked vehicle in the first row, a first feature of the first parked vehicle and a second feature of the first parked vehicle, wherein the second feature is different from the first feature, wherein the second feature of the first parked vehicle is located closer to the feeder lane than the first feature of the first parked vehicle;
    identifying, from the received second data of the second parked vehicle in the second row, a first feature of the second parked vehicle and a second feature of the second parked vehicle, wherein the second feature of the second parked vehicle is different from the first feature of the second parked vehicle, wherein the second feature of the second parked vehicle is located closer to the feeder lane than the first feature of the second parked vehicle;
    determining a traffic direction of the feeder lane based on the identified first and second features of the first parked vehicle and the identified first and second features of the second parked vehicle; and
    outputting an alert via an output device of the own vehicle based on determining that the determined traffic direction of the feeder lane is different from a traveling direction of the own vehicle,
    wherein determining the traffic direction of the feeder lane further comprises:
        determining a traffic direction of a first side of the feeder lane based on the identified first feature of the first parked vehicle and the identified second feature of the first parked vehicle, wherein the first side of the feeder lane is located along the first row of parking spaces;
        determining a traffic direction of a second side of the feeder lane based on the identified first feature and the identified second feature of the first parked vehicle, wherein the second side of the feeder lane is located along the second row of parking spaces;
        comparing the determined traffic direction of the first side of the feeder lane and the determined traffic direction of the second side of the feeder lane to each other;
        when the determined traffic direction of the first side of the feeder lane matches the determined traffic direction of the second side of the feeder lane, determining that the feeder lane is an one-way feeder lane; and
        when the determined traffic direction of the first side of the feeder lane is different from the determined traffic direction of the second side of the feeder lane, determining that the feeder lane is a two-way feeder lane, and
    wherein when the feeder lane is determined to be the one-way feeder lane, a traffic direction of the one-way feeder lane is determined based on the determined traffic direction of the first side of the feeder lane and the determined traffic direction of the second side of the feeder lane.

2. The computer-implemented method of claim 1,
wherein when the feeder lane is determined to be the two-way feeder lane, whether the own vehicle is traveling in a left-hand-traffic designated area or a right-hand-traffic designated area,
wherein when the own vehicle is traveling in the left-hand-traffic designed area, a first recommendation to stay on a left side of the feeder lane is output via the output device, and
wherein when the own vehicle is traveling in the right-hand-traffic designated area, a second recommendation to stay on a right side of the feeder lane is output via the output device.

3. The computer-implemented method of claim 1, wherein determining the traffic direction of the feeder lane further comprises:
calculating a first distance between the first feature of the first parked vehicle and a reference point on the own vehicle;
calculating a second distance between the second feature of the first parked vehicle and the reference point on the own vehicle;
when the first distance is less than the second distance, determining that the traffic direction of the first side of the feeder lane is a first direction, wherein the first direction is a direction against the traveling direction of the own vehicle;
when the first distance is greater than the second distance, determining that the traffic direction of the first side of the feeder lane is a second direction, wherein the second direction is opposite the first direction, and wherein the second direction is a direction along the traveling direction of the own vehicle;
calculating a third distance between the first feature of the second parked vehicle and the reference point on the own vehicle;
calculating a fourth distance between the second feature of the second parked vehicle and the reference point on the own vehicle;
when the third distance is less than the fourth distance, determining that the traffic direction of the second side of the feeder lane is the first direction; and
when the third distance is greater than the fourth distance, determining that the traffic direction of the first side of the feeder lane is the second direction.

4. The computer-implemented method of claim 1, wherein determining the traffic direction of the feeder lane further comprises:
identifying a reference point on the own vehicle;
setting a first point at the first feature of the first parked vehicle;
setting a second point based on the reference point and the first point to generate a first right triangle using the reference point, the first point, and the second point such that a right angle of the first right triangle is located at the second point, wherein the second point is set closer to the feeder lane than the first point;
calculating a first reference length extending between the reference point and the second point;
setting a third point at the second feature of the first parked vehicle;
setting a fourth point based on the reference point and the third point to generate a second right triangle using the reference point, the third point, and the fourth point such that a right angle of the second right triangle is located at the fourth point, wherein the fourth point is set closer to the feeder lane than the third point;
calculating a second reference length extending between the reference point and the fourth point;
when the first reference length is shorter than the second reference length, determining that the traffic direction of the first side of the feeder lane is a first direction, wherein the first direction is a direction against the traveling direction of the own vehicle;
when the first reference length is longer than the second reference length, determining that the traffic direction of the first side of the feeder lane is a second direction, wherein the second direction is opposite the first direction, and wherein the second direction is a direction along the traveling direction of the own vehicle;
setting a fifth point at the first feature of the second parked vehicle;
setting a sixth point based on the reference point and the fifth point to generate a third right triangle using the reference point, the fifth point, and the sixth point such that a right angle of the third right triangle is located at the sixth point, wherein the sixth point is set closer to the feeder lane than the fifth point;
calculating a third reference length extending between the reference point and the sixth point;
setting a seventh point at the second feature of the second parked vehicle;
setting a eighth point based on the reference point and the seventh point to generate a fourth right triangle using the reference point, the seventh point, and the eighth point such that a right angle of the fourth right triangle is located at the eighth point, wherein the eighth point is set closer to the feeder lane than the seventh point;
calculating a fourth reference length extending between the reference point and the eighth point;
when the third reference length is shorter than the fourth reference length, determining that the traffic direction of the second side of the feeder lane is the first direction; and
when the third reference length is longer than the fourth reference length, determining that the traffic direction of the second side of the feeder lane is the second direction.

5. The computer-implemented method of claim 1 [4]], wherein determining the traffic direction of the feeder lane further comprises:
setting a first point at the first feature of the first parked vehicle;
setting a second point at the second feature of the first parked vehicle;
setting a third point based on the first point and the second point to generate a first right triangle using the first point, the second point, and the third point such that a right angle of the first right triangle is located at the third point, wherein the third point is set closer to the feeder lane than the first point;
calculating a first reference degree of an internal angle at the second point;
when (1) the second point is farther away from the own vehicle than the third point and (2) the first reference degree is less than a threshold degree, determining that the traffic direction of the first side of the feeder lane is a first direction, wherein the first direction is a direction against the traveling direction of the own vehicle;
when (1) the second point is closer to the own vehicle than the third point or (2) (a) the second point is farther away from the own vehicle than the third point and (b) the first reference degree is greater than the threshold degree, determining that the traffic direction of the first side of the feeder lane is a second direction, wherein the second direction is opposite the first direction, and wherein the second direction is a direction along the traveling direction of the own vehicle;

setting a fourth point at the first feature of the second parked vehicle;

setting a fifth point at the second feature of the second parked vehicle;

setting a sixth point based on the fourth point and the fifth point to generate a second right triangle using the fourth point, the fifth point, and the sixth point such that a right angle of the second right triangle is located at the sixth point, wherein the sixth point is set closer to the feeder lane than the fourth point;

calculating a second reference degree of an internal angle at the fifth point;

when (1) the fifth point is farther away from the own vehicle than the sixth point and (2) the second reference degree is less than the threshold degree, determining that the traffic direction of the second side of the feeder lane is the first direction; and when (1) the fifth point is closer to the own vehicle than the sixth point or (2) (a) the fifth point is farther away from the own vehicle than the sixth point and (b) the second reference degree is greater than the threshold degree, determining that the traffic direction of the second side of the feeder lane is the second direction.

6. A system comprising:

circuitry that perform operations comprising:

detecting that an own vehicle enters a feeder lane in a parking facility;

receiving, from an external sensor mounted on the own vehicle, first data of a first parked vehicle parked in a first row of parking spaces adjacent the feeder lane and second data of a second parked vehicle parked in a second row of parking spaces adjacent the feeder lane;

identifying, from the received first data of the first parked vehicle in the first row, a first feature of the first parked vehicle and a second feature of the first parked vehicle, wherein the second feature is different from the first feature, wherein the second feature of the first parked vehicle is located closer to the feeder lane than the first feature of the first parked vehicle;

identifying, from the received second data of the second parked vehicle in the second row, a first feature of the second parked vehicle and a second feature of the second parked vehicle, wherein the second feature of the second parked vehicle is different from the first feature of the second parked vehicle, wherein the second feature of the second parked vehicle is located closer to the feeder lane than the first feature of the second parked vehicle;

determining a traffic direction of the feeder lane based on the identified first and second features of the first parked vehicle and the identified first and second features of the second parked vehicle; and outputting an alert via an output device of the own vehicle based on determining that the determined traffic direction of the feeder lane is different from a traveling direction of the own vehicle, wherein determining the traffic direction of the feeder lane further comprises:

determining a traffic direction of a first side of the feeder lane based on the identified first feature of the first parked vehicle and the identified second feature of the first parked vehicle, wherein the first side of the feeder lane is located along the first row of parking spaces;

determining a traffic direction of a second side of the feeder lane based on the identified first feature and the identified second feature of the first parked vehicle, wherein the second side of the feeder lane is located along the second row of parking spaces;

comparing the determined traffic direction of the first side of the feeder lane and the determined traffic direction of the second side of the feeder lane to each other;

when the determined traffic direction of the first side of the feeder lane matches the determined traffic direction of the second side of the feeder lane, determining that the feeder lane is an one-way feeder lane; and when the determined traffic direction of the first side of the feeder lane is different from the determined traffic direction of the second side of the feeder lane, determining that the feeder lane is a two-way feeder lane, and wherein when the feeder lane is determined to be the one-way feeder lane, a traffic direction of the one-way feeder lane is determined based on the determined traffic direction of the first side of the feeder lane and the determined traffic direction of the second side of the feeder lane.

7. The system of claim 6, wherein when the feeder lane is determined to be the two-way feeder lane, whether the own vehicle is traveling in a left-hand-traffic designated area or a right-hand-traffic designated area, wherein when the own vehicle is traveling in the left-hand-traffic designed area, a first recommendation to stay on a left side of the feeder lane is output via the output device, and wherein when the own vehicle is traveling in the right-hand-traffic designated area, a second recommendation to stay on a right side of the feeder lane is output via the output device.

8. The system of claim 6, wherein determining the traffic direction of the feeder lane further comprises:

calculating a first distance between the first feature of the first parked vehicle and a reference point on the own vehicle;

calculating a second distance between the second feature of the first parked vehicle and the reference point on the own vehicle;

when the first distance is less than the second distance, determining that the traffic direction of the first side of the feeder lane is a first direction, wherein the first direction is a direction against the traveling direction of the own vehicle;

when the first distance is greater than the second distance, determining that the traffic direction of the first side of the feeder lane is a second direction, wherein the second direction is opposite the first direction, and wherein the second direction is a direction along the traveling direction of the own vehicle;

calculating a third distance between the first feature of the second parked vehicle and the reference point on the own vehicle;

calculating a fourth distance between the second feature of the second parked vehicle and the reference point on the own vehicle;

when the third distance is less than the fourth distance, determining that the traffic direction of the second side of the feeder lane is the first direction; and when the third distance is greater than the fourth distance, determining that the traffic direction of the first side of the feeder lane is the second direction.

9. The system of claim 6, wherein determining the traffic direction of the feeder lane further comprises:
- identifying a reference point on the own vehicle;
- setting a first point at the first feature of the first parked vehicle;
- setting a second point based on the reference point and the first point to generate a first right triangle using the reference point, the first point, and the second point such that a right angle of the first right triangle is located at the second point, wherein the second point is set closer to the feeder lane than the first point;
- calculating a first reference length extending between the reference point and the second point;
- setting a third point at the second feature of the first parked vehicle;
- setting a fourth point based on the reference point and the third point to generate a second right triangle using the reference point, the third point, and the fourth point such that a right angle of the second right triangle is located at the fourth point, wherein the fourth point is set closer to the feeder lane than the third point;
- calculating a second reference length extending between the reference point and the fourth point;
- when the first reference length is shorter than the second reference length, determining that the traffic direction of the first side of the feeder lane is a first direction, wherein the first direction is a direction against the traveling direction of the own vehicle;
- when the first reference length is longer than the second reference length, determining that the traffic direction of the first side of the feeder lane is a second direction, wherein the second direction is opposite the first direction, and wherein the second direction is a direction along the traveling direction of the own vehicle;
- setting a fifth point at the first feature of the second parked vehicle;
- setting a sixth point based on the reference point and the fifth point to generate a third right triangle using the reference point, the fifth point, and the sixth point such that a right angle of the third right triangle is located at the sixth point, wherein the sixth point is set closer to the feeder lane than the fifth point;
- calculating a third reference length extending between the reference point and the sixth point;
- setting a seventh point at the second feature of the second parked vehicle;
- setting a eighth point based on the reference point and the seventh point to generate a fourth right triangle using the reference point, the seventh point, and the eighth point such that a right angle of the fourth right triangle is located at the eighth point, wherein the eighth point is set closer to the feeder lane than the seventh point;
- calculating a fourth reference length extending between the reference point and the eighth point;
- when the third reference length is shorter than the fourth reference length, determining that the traffic direction of the second side of the feeder lane is the first direction; and
- when the third reference length is longer than the fourth reference length, determining that the traffic direction of the second side of the feeder lane is the second direction.

10. The system of claim 6, wherein determining the traffic direction of the feeder lane further comprises:
- setting a first point at the first feature of the first parked vehicle;
- setting a second point at the second feature of the first parked vehicle;
- setting a third point based on the first point and the second point to generate a first right triangle using the first point, the second point, and the third point such that a right angle of the first right triangle is located at the third point, wherein the third point is set closer to the feeder lane than the first point;
- calculating a first reference degree of an internal angle at the second point;
- when (1) the second point is farther away from the own vehicle than the third point and (2) the first reference degree is less than a threshold degree, determining that the traffic direction of the first side of the feeder lane is a first direction, wherein the first direction is a direction against the traveling direction of the own vehicle;
- when (1) the second point is closer to the own vehicle than the third point or (2) (a) the second point is farther away from the own vehicle than the third point and (b) the first reference degree is greater than the threshold degree, determining that the traffic direction of the first side of the feeder lane is a second direction, wherein the second direction is opposite the first direction, and wherein the second direction is a direction along the traveling direction of the own vehicle;
- setting a fourth point at the first feature of the second parked vehicle;
- setting a fifth point at the second feature of the second parked vehicle;
- setting a sixth point based on the fourth point and the fifth point to generate a second right triangle using the fourth point, the fifth point, and the sixth point such that a right angle of the second right triangle is located at the sixth point, wherein the sixth point is set closer to the feeder lane than the fourth point;
- calculating a second reference degree of an internal angle at the fifth point;
- when (1) the fifth point is farther away from the own vehicle than the sixth point and (2) the second reference degree is less than the threshold degree, determining that the traffic direction of the second side of the feeder lane is the first direction; and
- when (1) the fifth point is closer to the own vehicle than the sixth point or (2) (a) the fifth point is farther away from the own vehicle than the sixth point and (b) the second reference degree is greater than the threshold degree, determining that the traffic direction of the second side of the feeder lane is the second direction.

11. A system comprising:
- circuitry that perform operations comprising:
  - detecting that an own vehicle enters a feeder lane in a parking facility;
  - receiving, from an external sensor mounted on the own vehicle, first data of a first parked vehicle parked in a first row of parking spaces adjacent the feeder lane and second data of a second parked vehicle parked in a second row of parking spaces adjacent the feeder lane;
  - identifying, from the received first data of the first parked vehicle in the first row, a first feature of the first parked vehicle and a second feature of the first parked vehicle, wherein the second feature is different from the first feature, wherein the second feature of the first parked vehicle is located closer to the feeder lane than the first feature of the first parked vehicle;
  - identifying, from the received second data of the second parked vehicle in the second row, a first feature of the second parked vehicle and a second feature of the second parked vehicle, wherein the second feature of the second parked vehicle is different from the first feature of the second parked vehicle, wherein the second feature of the second parked vehicle is located closer to the feeder lane than the first feature of the second parked vehicle;

determining a traffic direction of the feeder lane based on the identified first and second features of the first parked vehicle and the identified first and second features of the second parked vehicle; and outputting an alert via an output device of the own vehicle based on determining that the determined traffic direction of the feeder lane is different from a traveling direction of the own vehicle, wherein determining the traffic direction of the feeder lane further comprises:

determining a traffic direction of a first side of the feeder lane based on the identified first feature of the first parked vehicle and the identified second feature of the first parked vehicle, wherein the first side of the feeder lane is located along the first row of parking spaces;

determining a traffic direction of a second side of the feeder lane based on the identified first feature and the identified second feature of the first parked vehicle, wherein the second side of the feeder lane is located along the second row of parking spaces;

comparing the determined traffic direction of the first side of the feeder lane and the determined traffic direction of the second side of the feeder lane to each other;

when the determined traffic direction of the first side of the feeder lane matches the determined traffic direction of the second side of the feeder lane, determining that the feeder lane is an one-way feeder lane; and when the determined traffic direction of the first side of the feeder lane is different from the determined traffic direction of the second side of the feeder lane, determining that the feeder lane is a two-way feeder lane, wherein when the feeder lane is determined to be the one-way feeder lane, a traffic direction of the one-way feeder lane is determined based on the determined traffic direction of the first side of the feeder lane and the determined traffic direction of the second side of the feeder lane, wherein when the feeder lane is determined to be the two-way feeder lane, whether the own vehicle is traveling in a left-hand-traffic designated area or a right-hand-traffic designated area, wherein when the own vehicle is traveling in the left-hand-traffic designed area, a first recommendation to stay on a left side of the feeder lane is output via the output device, and wherein when the own vehicle is traveling in the right-hand-traffic designated area, a second recommendation to stay on a right side of the feeder lane is output via the output device.

12. The system of claim 11, wherein determining the traffic direction of the feeder lane further comprises:

calculating a first distance between the first feature of the first parked vehicle and a reference point on the own vehicle;

calculating a second distance between the second feature of the first parked vehicle and the reference point on the own vehicle;

when the first distance is less than the second distance, determining that the traffic direction of the first side of the feeder lane is a first direction, wherein the first direction is a direction against the traveling direction of the own vehicle;

when the first distance is greater than the second distance, determining that the traffic direction of the first side of the feeder lane is a second direction, wherein the second direction is opposite the first direction, and wherein the second direction is a direction along the traveling direction of the own vehicle;

calculating a third distance between the first feature of the second parked vehicle and the reference point on the own vehicle;

calculating a fourth distance between the second feature of the second parked vehicle and the reference point on the own vehicle;

when the third distance is less than the fourth distance, determining that the traffic direction of the second side of the feeder lane is the first direction; and when the third distance is greater than the fourth distance, determining that the traffic direction of the first side of the feeder lane is the second direction.

13. The system of claim 11, wherein determining the traffic direction of the feeder lane further comprises:

identifying a reference point on the own vehicle;

setting a first point at the first feature of the first parked vehicle;

setting a second point based on the reference point and the first point to generate a first right triangle using the reference point, the first point, and the second point such that a right angle of the first right triangle is located at the second point, wherein the second point is set closer to the feeder lane than the first point;

calculating a first reference length extending between the reference point and the second point;

setting a third point at the second feature of the first parked vehicle;

setting a fourth point based on the reference point and the third point to generate a second right triangle using the reference point, the third point, and the fourth point such that a right angle of the second right triangle is located at the fourth point, wherein the fourth point is set closer to the feeder lane than the third point;

calculating a second reference length extending between the reference point and the fourth point;

when the first reference length is shorter than the second reference length, determining that the traffic direction of the first side of the feeder lane is a first direction, wherein the first direction is a direction against the traveling direction of the own vehicle;

when the first reference length is longer than the second reference length, determining that the traffic direction of the first side of the feeder lane is a second direction, wherein the second direction is opposite the first direction, and wherein the second direction is a direction along the traveling direction of the own vehicle;

setting a fifth point at the first feature of the second parked vehicle;

setting a sixth point based on the reference point and the fifth point to generate a third right triangle using the reference point, the fifth point, and the sixth point such that a right angle of the third right triangle is located at the sixth point, wherein the sixth point is set closer to the feeder lane than the fifth point;

calculating a third reference length extending between the reference point and the sixth point;

setting a seventh point at the second feature of the second parked vehicle;

setting a eighth point based on the reference point and the seventh point to generate a fourth right triangle using the reference point, the seventh point, and the eighth point such that a right angle of the fourth right triangle is located at the eighth point, wherein the eighth point is set closer to the feeder lane than the seventh point;

calculating a fourth reference length extending between the reference point and the eighth point;

when the third reference length is shorter than the fourth reference length, determining that the traffic direction of the second side of the feeder lane is the first direction; and when the third reference length is longer than the fourth reference length, determining that the traffic direction of the second side of the feeder lane is the second direction.

14. The system of claim 11, wherein determining the traffic direction of the feeder lane further comprises:

setting a first point at the first feature of the first parked vehicle;

setting a second point at the second feature of the first parked vehicle;

setting a third point based on the first point and the second point to generate a first right triangle using the first point, the second point, and the third point such that a right angle of the first right triangle is located at the third point, wherein the third point is set closer to the feeder lane than the first point;

calculating a first reference degree of an internal angle at the second point;

when (1) the second point is farther away from the own vehicle than the third point and (2) the first reference degree is less than a threshold degree, determining that the traffic direction of the first side of the feeder lane is a first direction, wherein the first direction is a direction against the traveling direction of the own vehicle;

when (1) the second point is closer to the own vehicle than the third point or (2) (a) the second point is farther away from the own vehicle than the third point and (b) the first reference degree is greater than the threshold degree, determining that the traffic direction of the first side of the feeder lane is a second direction, wherein the second direction is opposite the first direction, and wherein the second direction is a direction along the traveling direction of the own vehicle;

setting a fourth point at the first feature of the second parked vehicle;

setting a fifth point at the second feature of the second parked vehicle;

setting a sixth point based on the fourth point and the fifth point to generate a second right triangle using the fourth point, the fifth point, and the sixth point such that a right angle of the second right triangle is located at the sixth point, wherein the sixth point is set closer to the feeder lane than the fourth point;

calculating a second reference degree of an internal angle at the fifth point;

when (1) the fifth point is farther away from the own vehicle than the sixth point and (2) the second reference degree is less than the threshold degree, determining that the traffic direction of the second side of the feeder lane is the first direction; and when (1) the fifth point is closer to the own vehicle than the sixth point or (2) (a) the fifth point is farther away from the own vehicle than the sixth point and (b) the second reference degree is greater than the threshold degree, determining that the traffic direction of the second side of the feeder lane is the second direction.

* * * * *